US009165085B2

(12) United States Patent
Guardalben

(10) Patent No.: US 9,165,085 B2
(45) Date of Patent: Oct. 20, 2015

(54) SYSTEM AND METHOD FOR PUBLISHING AGGREGATED CONTENT ON MOBILE DEVICES

(75) Inventor: Giovanni Vito Guardalben, Arbizzano di Valp (IT)

(73) Assignee: KIPCAST CORPORATION, Toronto, ON (CA)

(*) Notice: Subject to any disclaimer, the term of this patent is extended or adjusted under 35 U.S.C. 154(b) by 39 days.

(21) Appl. No.: 12/938,156

(22) Filed: Nov. 2, 2010

(65) Prior Publication Data

US 2011/0113047 A1    May 12, 2011

Related U.S. Application Data

(60) Provisional application No. 61/272,813, filed on Nov. 6, 2009.

(51) Int. Cl.
 *G06F 7/00* (2006.01)
 *G06F 17/30* (2006.01)
 *G06F 17/27* (2006.01)

(52) U.S. Cl.
 CPC ...... *G06F 17/30905* (2013.01); *G06F 17/2785* (2013.01)

(58) Field of Classification Search
 CPC .................................................. G06F 17/2785
 USPC ....................................................... 707/754
 See application file for complete search history.

(56) References Cited

U.S. PATENT DOCUMENTS

| | | | |
|---|---|---|---|
| 6,973,423 B1* | 12/2005 | Nunberg et al. | 704/1 |
| 2002/0169771 A1* | 11/2002 | Melmon et al. | 707/5 |
| 2006/0235885 A1* | 10/2006 | Steele et al. | 707/104.1 |
| 2006/0294396 A1 | 12/2006 | Witman et al. | |
| 2007/0050466 A1 | 3/2007 | Kraft et al. | |
| 2007/0061487 A1 | 3/2007 | Moore et al. | |
| 2007/0130589 A1 | 6/2007 | Davis et al. | |
| 2008/0010337 A1 | 1/2008 | Hayes et al. | |
| 2008/0082477 A1 | 4/2008 | Dominowska et al. | |
| 2008/0126450 A1 | 5/2008 | O'Neill et al. | |
| 2008/0307053 A1* | 12/2008 | Mitnick et al. | 709/205 |
| 2009/0055727 A1 | 2/2009 | Hansen et al. | |
| 2012/0023104 A1* | 1/2012 | Johnson et al. | 707/740 |

OTHER PUBLICATIONS

Openkapow Tutorials : FAQ; Online at http://openkapow.com/blogs/support/archive/2006/12/04/FAQ.aspx; Accessed May 11, 2009; KapowTech.com.
Extracts from Google News; http://news.google.com/; http://news.google.com/news/advanced_news_search?pz=1&ned=us&hl=en; http://www.google.com/alerts?pz=us&h1=en&t=1&source=news&cd=1; Accessed May 20, 2009.

(Continued)

*Primary Examiner* — Ajith Jacob

(57) ABSTRACT

A system and method are provided for publishing aggregated content. A syndication server is connected and in communication with one or more online information sources through a network. The syndication server extracts the aggregated content from the online information sources. The syndication server then re-structures the content, followed by enriching the semantics of the content. The modified content is then republished and made available on structured folders. A transfer protocol transfers the modified content to one or more mobile devices in communication with the syndication server.

16 Claims, 21 Drawing Sheets

(56) References Cited

OTHER PUBLICATIONS

Openkapow Getting Started : Learn more about openkapow robots; Online at http://openkapow.com/blogs/getting_started/archive/2007/02/15/Learn-more-about-openkapow-robots.aspx; Accessed May 11, 2009; KapowTech.com.

Openkapow Getting Started ; Publish and Use Robots; Online at http://openkapow.com/blogs/getting_started/archive/2007/02/19/Publish-and-Use-Robots.aspx; Accessed May 11, 2009; KapowTech.com.

Kapow Web Data Server; Online at http://kapowtech.com/index.php/products/overview; Accessed May 20, 2009; Kapow Technologies.

Automating Content Migration Using Software, Not People; May 2008; Online at http://www.kapowtech.com/pdf/collateral/content_migration_wp.pdf.

Automated Trader News Articles—Kapow and Paremus Partner to Deliver Enterprise Scale, Semantically Enriched Mashup Capability; Online at http://www.automatedtrader.net/algo-trading-news-812.xhtm; Accessed May 20, 2009; Automated Trader Ltd 2009.

Linthicum, D.; Leveraging Critical Business Data for Mashups, SOAs, and Enterprise Applications; Available online at http://kapowtech.com/pdf/collateral/wp_primer_enterprise_mashups.pdf; Accessed May 20, 2009.

Extract from http://feed.informer.com/; Accessed May 11, 2009.

FeedYes.com gives rss fees to sites without feeds; Online at www.feedyes.com; Accessed May 11, 2009; FeedYes.com 2006-2009.

Feed43 : How It Works; Online at www.feed43.com/how-it-works.html; Accessed May 11, 2009; A.I.Studio.

Pipes Blog >>About Pipes; Online at http://blog.pipes.yahoo.net/about-pipes/; Accessed May 20, 2009.

Guardalben, G.; "NewsMastering MySyndicaat: A Position Paper"; Published at least as early as May 6, 2009; http://www.kiocast.com/mySyndicaat.htm.

Miller, P.; "Semantic Web enables innovative steps at Reuters"; Mar. 11, 2008; Online at http://blogs.zdnet.com/semantic-web/?p=111; Accessed May 20, 2009.

Weiss, D.; Osinski, S.; "Carrot Clustering Framework"; Proceedings of the First International Conference on Open Source Systems, Genova, Jul. 11, to 15, 2005; pp. 298 to 299.

Dapper: The Data Mapper; http://open.dapper.net/; Yahoo! Inc.; publication date unknown.

Make custom mobile apps, web widgets, and rich media ads—Widgetbox; http://www.widgetbox.com/; Flite, Inc.; publication date unknown.

Yahoo! Widgets: useful, run, beautiful little apps for Mac and Windows; http://www.widoets.yahoo.com/; Yahoo! Inc.; publication date unknown.

* cited by examiner

/ 68

FeedBot: US - all

Subscription Title: The New York Times - world  / 70

Enter text to describe your subscription. This text will help you to identify the original source of content in your feedbot.

Content Type: Groovy RSS Content  — 72

Select the type of source of content that you want to retrieve and monitor. Currently, your selection is RSS/Atom XML Feeds + Groovy content scraping. Based on this selection, MySyndicaat will process the RSS/Atom content retrieved at the URL address specified below. MySyndicaat will apply content scraping techniques to customize syndication items.

URL Address: http://feeds.nytimes.com/nyt/rss/World   Test  — 74

Enter a valid URL address to your RSS/Atom XML feed. Make sure it points to an active feed site that contains valid syndication content.

Groovy Script: world/us_nytimes_rss.gdp  — 76

Enter the name of the custom Groovy script that performs custom conversion of content to syndication format.

Figure 5

SYSTEM AND METHOD FOR PUBLISHING AGGREGATED CONTENT ON MOBILE DEVICES

CROSS-REFERENCE TO RELATED APPLICATIONS

This application claims priority from U.S. provisional application No. 61/272,813 filed on Nov. 6, 2009, the contents of which are incorporated herein by reference.

TECHNICAL FIELD

The following relates to systems and methods for aggregating and publishing content on mobile devices.

BACKGROUND

In recent years there has been a rapid increase in the production and adoption of mobile devices and services in the worldwide marketplace. Wireless networks and operational capabilities potentially allow users to carry the devices almost anywhere and to use them to obtain and store electronic data. With the ability to employ a variety of data protocols, these devices have significant communications versatility.

Within this environment, technologies such as the HTTP (Hypertext Transfer Protocol), HTML (Hypertext Markup Language) and XML (extensible Markup Language) have helped to standardize the way devices and people communicate. For instance, XML is becoming a common way for allowing computer-based services to communicate with each other. One form of XML called RSS (Really Simple Syndication) allows content, for example news articles, to be published in a standard format. Presently, RSS-based content is available on the Internet, and are used in a number of forms including personal web logs and commercial news agencies. Other syndication forms, for example Atom, are also available. Generally, syndication allows for information to be provided in an up-to-date manner. The syndicated content can be delivered to mobile devices through wireless networks.

Accessing and viewing syndicated content from various sources on a mobile device can be time consuming and can increase the processing load on the mobile device.

BRIEF DESCRIPTION OF THE DRAWINGS

Embodiments will now be described by way of example only with reference to the appended drawings wherein:

FIG. 5 is an exemplary graphical user interface (GUI) of a feedbot.

DETAILED DESCRIPTION OF THE DRAWINGS

Figure 1:
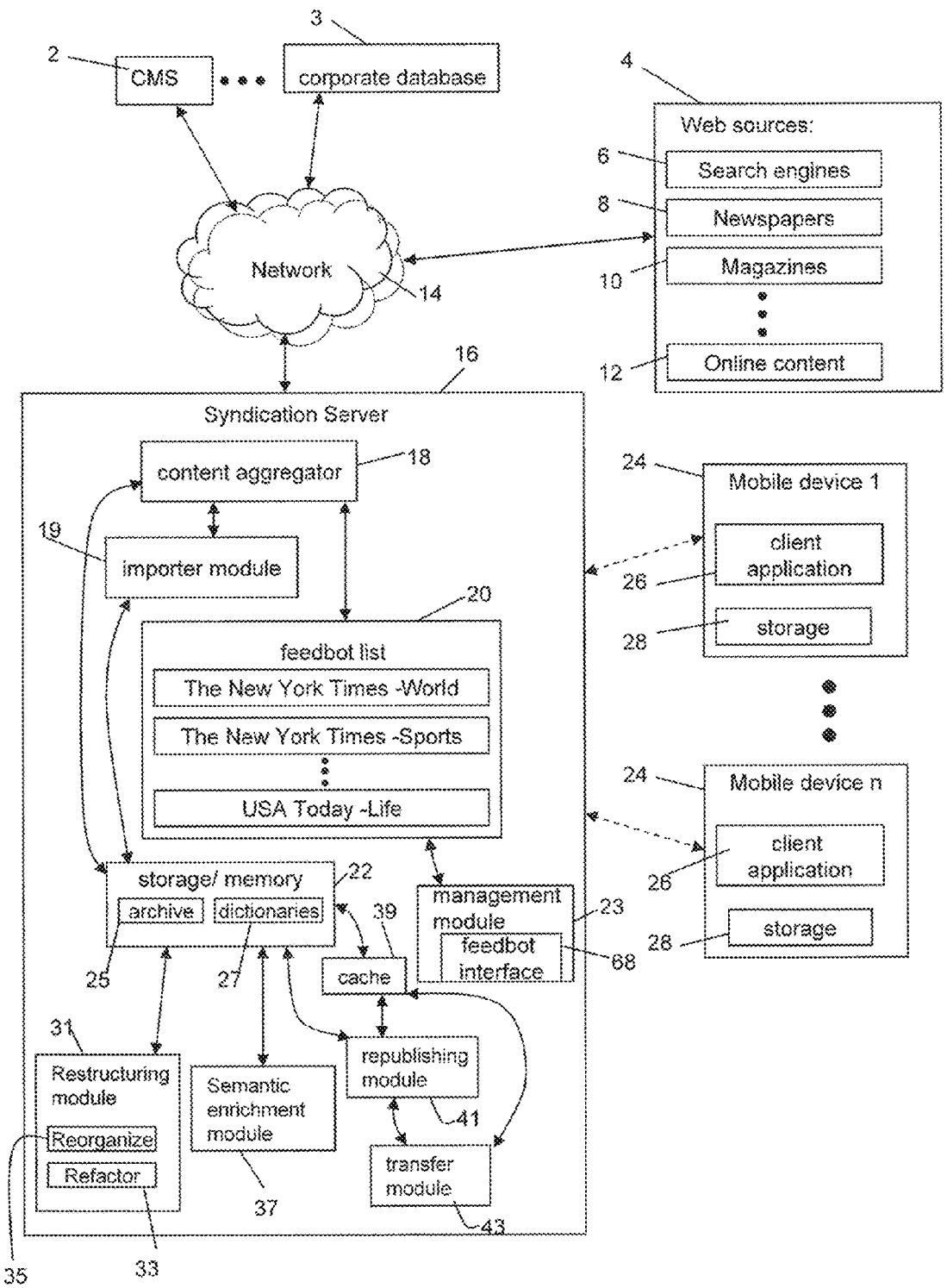
FIG. 1 is schematic diagram of a syndication server in communication with one or more information sources and one or more mobile devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The generation of online content continues to increase and is being provided by a growing number of different information sources, including online newspapers, magazines, blogs and corporate websites among others. It can be appreciated online content refers to information, such as text information, provided through the internet or a network. It may be difficult to sort through and find relevant online content based on a reader's preferences due to the volume and variety of online content. The process of searching, locating and presenting relevant online content to a reader can be time consuming, as well as constrained by the resources available on the reader's communication device. For example, limited memory, processing power and communication speeds of a communication device may increase the time to aggregate and publish relevant online content to a reader.

Examples of applicable communication devices include pagers, cellular phones, cellular smart-phones, wireless organizers, personal digital assistants, computers, laptops, netbooks, handheld wireless communication devices, wirelessly enabled notebook computers and the like. Such devices will hereinafter be commonly referred to as "mobile devices" for the sake of clarity.

A method and system are provided for aggregating online content, identifying relevant content, and publishing the relevant content to one or more mobile devices. Online content, such as text, from the Internet or a corporate database is extracted. This content is then re-organized into different streams and re-factored. It can be appreciated that refactoring in syndication allows for the rules of content aggregation and extraction to be modified while maintaining the semantic meaning of the syndicated content. The restructured and refactored content is then semantically enriched. Afterwards, the content is sent to one more mobile devices according to a publication protocol.

In another aspect, the method of publishing aggregated text to one or more mobile devices comprises a content aggregator in a syndication server extracting one or more text articles from an internet source or a database based on an address provided by a feedbot, wherein the one or more extracted articles form a stream. A restructuring module in the syndication server re-organizes the stream into one or more different sub-streams using one or more respective queries. The restructuring module also re-factors the one or more sub-streams by adding one or more tags to each of the text articles and then filtering the one or more sub-streams, thereby generating one or more sub-sub-streams. A semantic enrichment module in the syndication server clusters the text articles in the one or more sub-sub-streams to identify popular articles and correlates the popular articles with one or more related articles. The popular articles are stored in a cache in the syndication server. The syndication server transmits an information bundle to one or more mobile devices, wherein the information bundle includes, for example, a portion of text from each of the popular articles, one or more tags associated with each of the popular articles, and one or more links to the one or more related articles associated with each of the popular articles.

In another aspect, a system and a method are provided for aggregating text on at least one computing device, comprising: extracting one or more text articles from an internet source or a database, the one or more extracted articles forming a stream; performing one or more queries on the stream, each of the queries generating one or more different sub-streams of the text articles; adding one or more tags to each of the text articles and then filtering the one or more sub-streams, thereby generating one or more sub-sub-streams of the text articles; identifying popular articles in the sub-sub-streams and correlating one or more related articles with each of the popular articles; and, storing the popular articles and the related articles in a cache in the at least one computing device, the at least one computing device able to publish the popular articles stored in the cache.

In a further aspect, the at least one computing device transmits an information bundle to one or more mobile devices, the information bundle comprising: a portion of text of each of the popular articles, the one or more tags associated with each of the popular articles, and one or more links to the one or more related articles associated with each of the popular articles. Links can include hyperlinks, data links, and computer executable links.

In another further aspect, the internet source or the database is identified by at least an address.

In another further aspect, the one or more tags specifying at least one of: a news section from which one of the text articles is extracted; a name of an information source from which the one of the test articles is extracted; a type of content of the one of said text articles; and a data format of the one of the text articles.

In another further aspect, the at least one computing device performs filtering by, at least one of, excluding and including certain of the text articles in each of the one or more sub-streams.

In another further aspect, the at least one computing device applies at least one of the following conditions: include the text articles comprising one or more words of a first group of words; exclude the text articles comprising one or more words of a second group of words; include the text articles originating from a certain geographical location; and, include the text articles issued within a certain time period.

In another further aspect, the at least one computing device identifies the popular articles by: grouping the text articles according to one or more topics; and, sorting each of the topics according to the number of text articles under each of the topics, whereby the topics with the highest number of text articles are popular topics, and the text articles grouped under the popular topics are established as the popular articles.

In a further aspect, the at least one computing device correlates the related articles by: identifying an uncommon word in one of the popular articles; determining a frequency of the identified uncommon word in a candidate article; computing a correlation value proportional to the frequency; and, upon determining the correlation value is equal to or greater than a threshold value, establishing the candidate article as a related article correlated to the one of the popular articles.

In another further aspect, the correlation value is computed by determining a quotient of the frequency and a percentage value, the percentage value indicating the number of instances of the uncommon word in a collection of text relative to the total number words in the collection of text.

In another further aspect, the semantic enrichment module further adds semantic tags based on contextual meaning of words in each of the text articles.

In another further aspect, the popular articles are stored in folders in the cache, each folder indicating at least one of: one of the sub-sub-streams or one of the sub-streams to organize the popular articles; a refresh rate at which the popular articles are retrieved from one of the sub-sub-streams or one of the sub-streams; a folder size parameter, the folder size parameter establishing the number of text articles within each folder that can be sent to one of the mobile devices in a single transmission; and an article size parameter establishing the number of characters that can be stored in the cache with respect to each text article.

In another further aspect, the transmission of the information bundle is initiated by the at least one computing device receiving a request for information from one of the mobile devices.

In another further aspect, the information bundle further comprises a time parameter indicating how often an updated information bundle is to be sent to one of the mobile devices, the updated information bundle comprising one or more updated text articles.

In another further aspect, the at least one computing device sends along with the information bundle a time stamp indicating when the at least one computing device was most recently accessed by one of the mobile devices, and a date stamp indicating a publication date of a most recent article of the popular articles transmitted in said information bundle.

In another further aspect, at a later time, the at least one computing device transmits to the one of the mobile devices one or more updated articles that have been stored in the cache after the date stamp or that have been published after the publication date.

Turning first to FIG. 1, a syndication server 16 is provided. The server 16 may comprise one or more servers in communication with one another. It can be appreciated that a server is a computing device, or multiple computing devices, having or connected to memory 22 for storing data and computer executable instructions. The server 16 is in communication with a network 14 that can access a content management system (CMS) 2, corporate database 3, or web sources 4, or any combination thereof. Non-limiting examples of web sources 4 include search engines 6, online newspapers 8, online magazines 10, and other online content 12. Information from any of the web sources 4, CMS 2, or corporate databases 3 is retrieved by the syndication server 16 through the network 14, whereby the network 14 may be, for example, a local area network, a wide area network or the internet.

The syndication server 16 comprises a number of modules, including a content aggregator 18 and a feedbot list 20. The content aggregator 18 collects content through the network 14 and stores them onto the syndication server's memory 22. The feedbot list 20 is a database of different feedbots, wherein each feedbot contains the address or location of information sources on the network 14. It can therefore be understood that the content aggregator 18 collects content through the network 14 based on the addresses or locations provided by the feedbot list 20. A management module 23 allows a user who manages the process, also called an administrator, to manage the feedbot list 20. Through the management module 23, the administrator configures each of the parameters (e.g. information source or address, name of information source, data format, how often data is extracted, etc.) associated with each feedbot. The management module 23 may include a feedbot graphical interface 68 to allow the administrator to more easily configure the parameters. The syndication server 16 also includes an importer module 19 to create "rules" of extraction for situations where RSS or other syndication formats are not available. The importer module 19 is in communication with the content aggregator 18 and the memory 22. The importer module 19 converts non-RSS data, for example HTML data from websites, into an RSS format. The conversion of non-RSS data to RSS data can be implemented using scripting languages, for example Groovy scripting, which allows the conversion to occur automatically without stopping the content aggregation and publishing of aggregated data. It can be appreciated that the use of scripting in the importer module 19 also mitigates the need to use a daemon, which is a software that runs in the background rather than under the direct control of the user. In one embodiment, the importer module 19 obtains the non-RSS data from the content aggregator 18 and converts it to RSS data, before storing the RSS data into the memory 22. In another embodiment, the content aggregator 18 stores the non-RSS data into the memory 22, and then the importer module 19 converts the stored non-RSS data into RSS data, and saves the RSS data in the memory 22 in place of the non-RSS data.

The memory 22 stores an archive 25 of the aggregated content, such as articles, including groups or stream of content, some of which have been restructured, semantically enriched and republished. There are also a number of dictionaries 27 in the memory 22 that are used during any one or more of the restructuring, semantic enrichment and republishing processes. In particular, the restructuring module 31 contains computer executable instructions for reorganizing 35 and refactoring 33 the aggregated content. The semantic enrichment module 37 contains computer executable instructions for semantically enriching the aggregated content. Similarly, the republishing module 41 and transfer module 43 contain computer executable instructions for republishing aggregated content and transferring the republishing content to the mobile devices 24, respectively. As can be seen, the restructuring module 31, semantic enrichment module 37 and republishing module 41 are in communication with the syndication server's memory 22. The republishing module 41 and the memory 22 are also in communication with a memory cache 39, where republished articles that have been restructured and semantically enriched are stored so that they can be more quickly accessed. The cache 39, in a general sense, is a temporary storage medium where frequently accessed data can be stored for rapid access. It can also be seen that the transfer module 43 is in communication with the cache 39 so that the transfer module 43 and republishing module 41 can quickly access the republished articles and transmit these articles to the mobile devices 24. The process taken place at each of these modules are described in further detail below.

The syndication server 16 is in communication with one or more mobile devices 24, typically through wireless means as shown by the dotted lines in FIG. 1. Within each mobile device 24, there is a client application 26 and a memory storage device 28. The mobile device 24 also typically includes a display screen and a user interface mechanism, for example for entering text, to allow a user to interact with the client application 26. The client application 26 interacts with the mobile device 24 and the syndication server 16, as will be discussed in further detail below.

Figure 2:
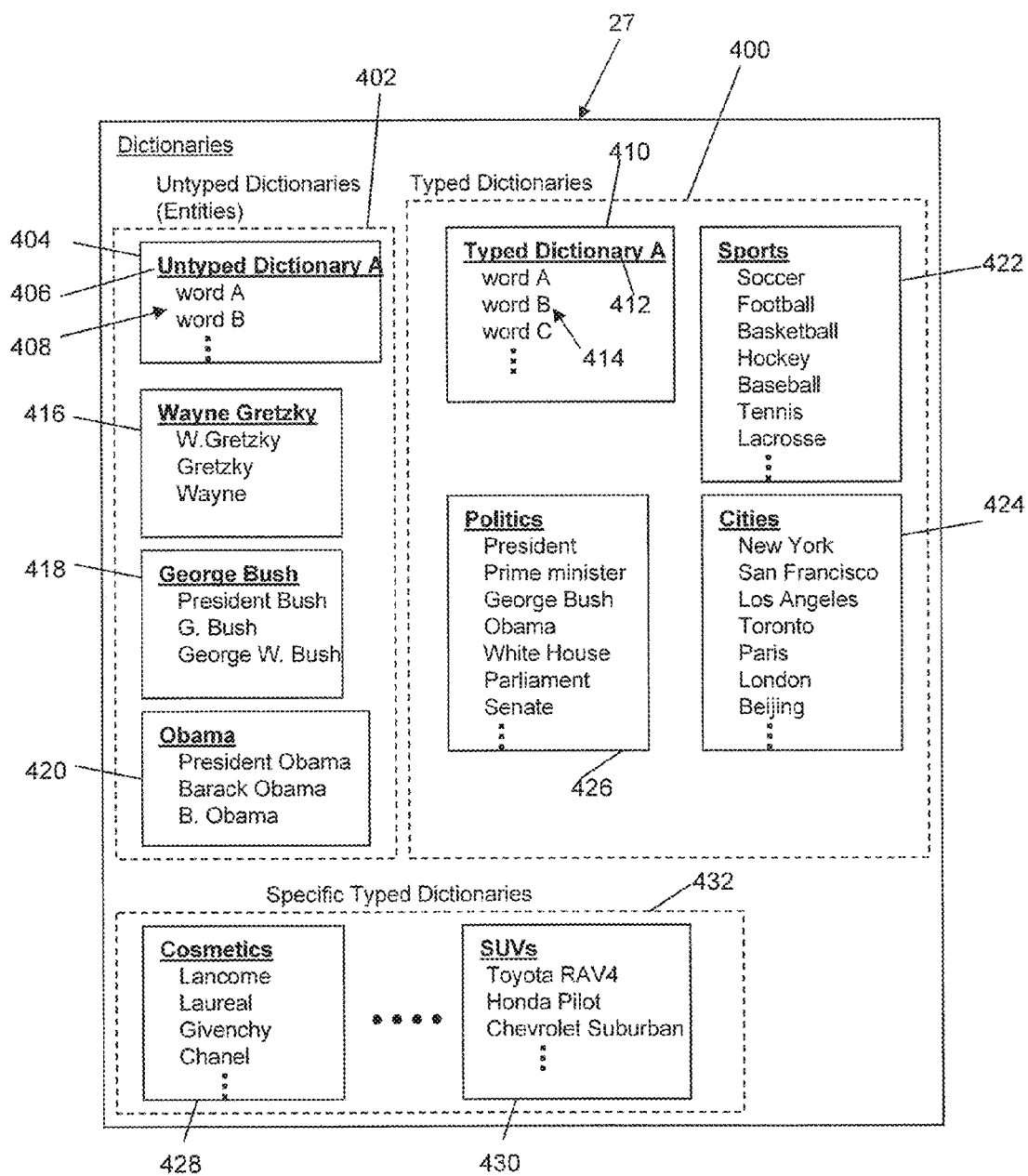
FIG. 2 is a block diagram of an exemplary configuration of dictionaries stored in the syndication server.

Turning to FIG. 2, the dictionaries 27 are shown, which include typed dictionaries 400 and untyped dictionaries 402. The dictionaries 27 are listings of words and phrases that have been grouped together under a common meaning. These groupings of words are used as tags to add further meaning to the collected content during the restructuring and semantic enrichment process. It can thus be appreciated that the restructuring module 31 and the semantic enrichment module 37 interact with the dictionaries 27 to the determine the context and meaning of certain words. Typed dictionaries 400, such as typed dictionary 410, include words or phrases 414 that are grouped under a heading 412 based on a perceived relationship between the words or phrases 414 to the heading 412. The perceived relationship is determined by an administrator of the syndication server 16, or by an end user at the mobile device 24. Generally, the perceived relationship in typed dictionaries 400 are more general and broader. For example, there may be a typed dictionary for sports 422, which includes a number of associated words such as soccer, football and basketball, etc. There may also be a typed dictionary for cities 424 with associated words such as New York, San Francisco and Paris. There may also be a typed dictionary for politics 426 with associated words such as president, prime minister, parliament, George Bush and Obama. As can be seen the perceived relationship for typed dictionaries 400 can be more general. In untyped dictionaries 402, for example untyped dictionary 404, there is a header 406, also referred to as the entity or target tag. A series of words 408 that are synonymous in a general sense with the target tag 406 are also included in the untyped dictionary 404. For example, an untyped dictionary for Wayne Gretzky 416 includes the words W. Gretzky and Gretzky. Thus, if any of these words are found, the syndication server 16 will know that these words relate to the target tag Wayne Gretzky. Similarly, typed dictionaries 418 and 420 list words that are synonymous in a general sense to 'George Bush' and 'Obama,' respectively. The dictionaries 27 may be manually created and maintained by a user or administrator, or may be automatically updated using known word association techniques. Such word association techniques may, for example, rely on heuristics of articles and literature collected over many years. The use of the dictionaries 27 is described further below in the context of the processes.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the syndication server 16 or mobile device 24 or accessible or connectable thereto. Any application or module herein described may be implemented using computer readable/executable instructions that may be stored or otherwise held by such computer readable media.

Figure 3:
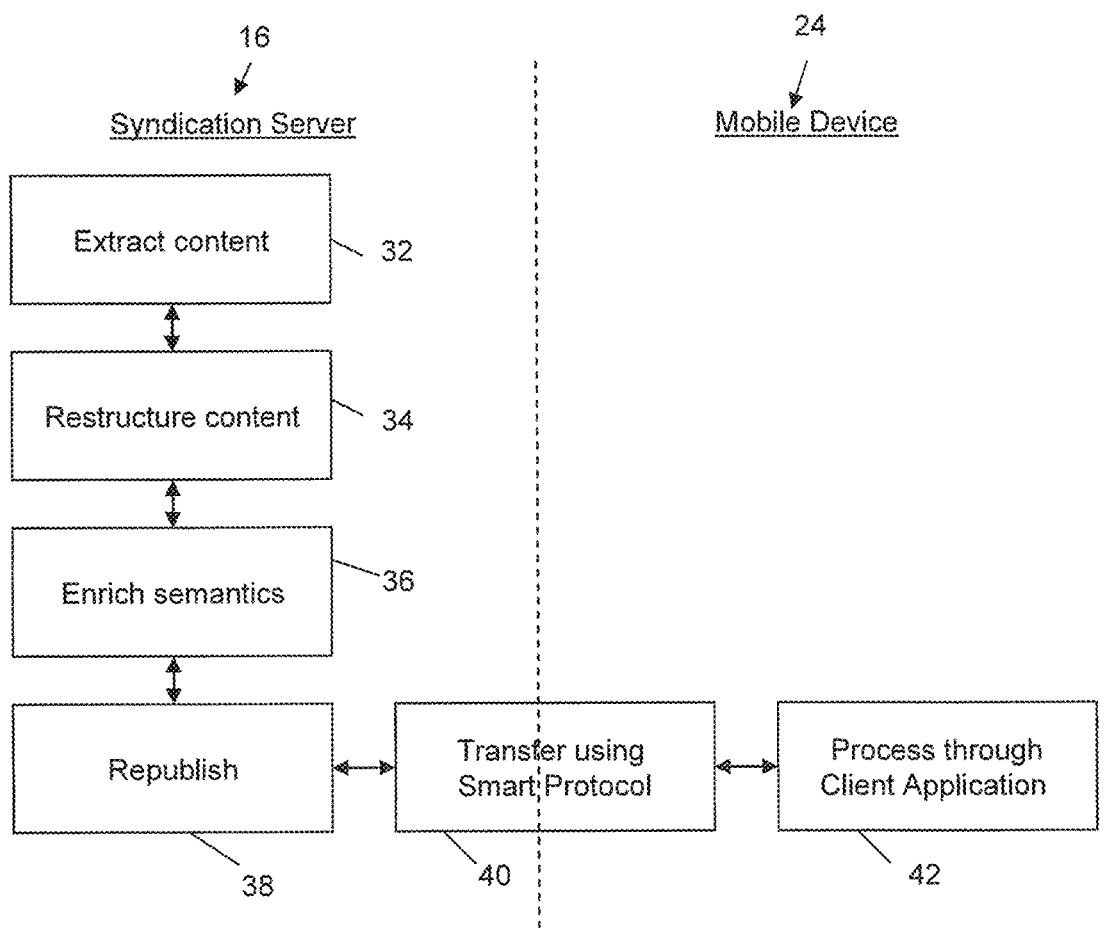
FIG. 3 is a flow diagram of a method of publishing aggregated content to a mobile device, which includes extracting content, restructuring content, enriching semantics, republishing, transferring content and processing content through a client application.

Turning to FIG. 3, a number of processes are shown, including the process 32 in which the syndication server 16 extracts content through the network 14 from any one of the web sources 4, the CMS 2 and the corporate database 3. The extracted content is restructured 34, semantically enriched 36 and then republished 38. The republished content is communicated to one or more mobile devices 24 according to a transfer protocol 40. The transfer protocol 40 interfaces with the client application 26 on each of the mobile devices 24, so that the client application 26 processes and displays the republished content on the respective mobile device 24.

In particular, when extracting content 32, the feedbot list 20, content aggregator module 18, and importer module 19 are used to extract content through the network 14 and store the extracted or aggregated content into the memory 22. In the restructuring process 34, which is implemented by the restructuring module 31, the aggregated content that is stored in the memory 22 is restructured into streams or sub-streams of content, or both. The restructuring module 31 stores the streams or sub-streams, or both, into the memory 22, and in particular the archive 25. In the semantic enrichment process 36, which is implemented by the semantic enrichment module 37, the restructured streams or sub-streams are extracted from the archive 25, semantically enriched, and then returned to the archive 25. Then, in the republishing process 38, which is implemented by the republishing module 41, the restructured and semantically enriched content is republished and stored into the cache 39, so that the content can be more quickly transferred. The transfer module 43 may relay requests for certain content from the mobile devices 24 to the republishing module 41. Therefore, based in part on the transfer module 43, the republishing module 41 may determine which of the aggregated content is to be stored in the cache 39.

The transfer protocol 40, implemented by the transfer module 43, transmits the content stored on the cache 39 to the mobile devices 24.

Figure 4:
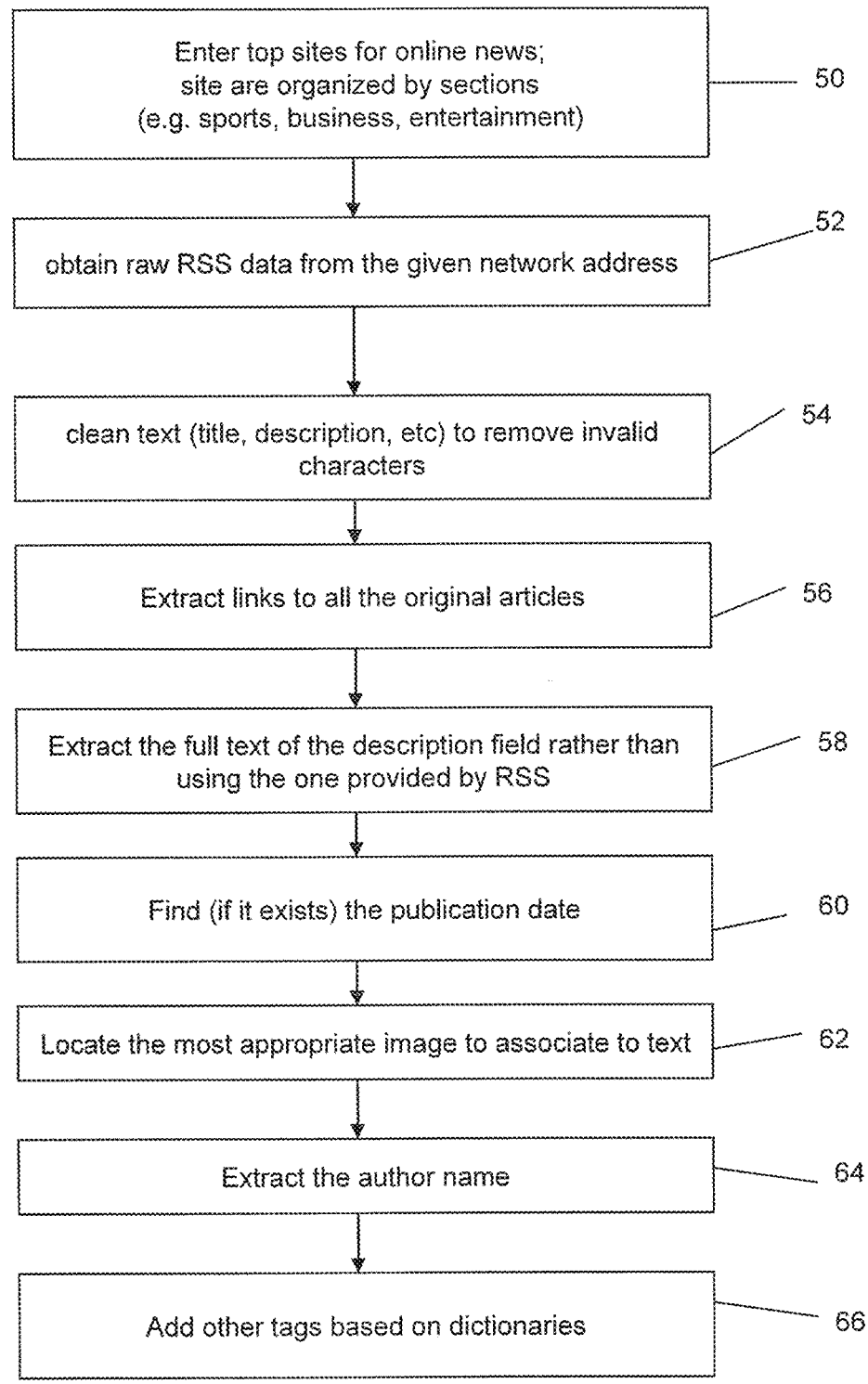
FIG. 4 is a flow diagram of the method for extracting content in FIG. 3.

Turning to FIG. 4, the content extraction process 32 is shown. First, the syndication server 16 accesses or enters any number of web sources 4, CMS 2, corporate databases 3, or combinations thereof. Typically, the syndication server 16 enters web sites with online news that are organized by sections (e.g. sports, business, entertainment, politics and technology), as per step 50. Examples of online newspapers 8 include The Chicago Tribune, The Huston Chronicles, The San Francisco Chronicles, The New York Times, The Washington Post and USA Today.

The syndication server 16 accesses the web sources 4, the CMS 2, and the corporate databases 3 using the addresses or location provided by the feedbot list module 20. In particular, a feedbot list module 20 in the syndication server 16 comprises a collection of online content sources references, or feedbots, from which to extract content. As shown in FIG. 5, an embodiment of a feedbot interface 68 allows a user to create separate feedbots for extracting content from a certain source. In FIG. 5, the feedbot interface 68 shows that the syndication server 16 will extract a stream of content from the "World" section in The New York Times, as per the subscription field 70. The stream or content or articles is referred to as a stream since they are grouped by the context of the feedbot parameters. A field 72 on the interface 68 shows that the content type will be of the RSS content provided by an URL address 74, in this example, http://feeds.nytimes.com/nyt/rss/World. There is also a groovy script field 76, wherein a user enters the custom script that converts the content to syndication format. It can be appreciated that groovy is a Java-like scripting language and that other scripting languages are also applicable to the principles described herein. Scripting languages generally do not require compilation steps to execute and are considered dynamic languages. Other non-limiting examples of scripting languages that are equally compatible include Java script, ECMA script, Perl and Python. Based on the parameters provided in this feedbot interface 68, an online content source reference, or feedbot, is generated. The content aggregator module 18 uses the online content source references, or feedbots, from the feedbot list 20 to access those addresses through the network 14. In other words, for the example provided, the content aggregator module 18 retrieves The New York Times URL address for the "World" section from the feedbot list 20 and then accesses or enters the website in order to retrieve content related to world news. Thus, a New York Times "World" stream of articles is generated by the feedbot and stored into the archive 25.

Turning back to FIG. 4, upon the content aggregator module 18 accessing the online content source, or website, the content aggregator module 18 then obtains RSS data from the given online content source, as per step 52. Content from the online content source or database is usually pulled or polled by the content aggregator module 18. In cases where the content source does not provide RSS data, the content aggregator module 18 obtains the non-RSS data and the importer module 19 converts the non-RSS data into an RSS format. It can be appreciated that RSS data can be generated by the importer module 19 using conversion rules that convert generic HTML or DHTML content into XML RSS format. In some cases, content is not pulled or polled by the content aggregator module 18, and instead may be pushed by the online content source, for example a web sites, which is configured by SMS alert systems. Once the RSS data has been obtained by a feedbot, it is stored as a stream in the syndication server's memory 22, and more particularly, the archive 25. It is noted that the stream of RSS data associated with each feedbot has not yet been processed at this stage. It can be appreciated that the RSS data provided from the online content source is sometimes referred to as an RSS feed. The syndication sewer 16 then cleans or scrubs all of the RSS text, including the title and description, to remove any invalid characters or symbols, as per step 54. The syndication server 16 removes the invalid characters and symbols by searching for these through the RSS feed, and then deleting any of the found invalid characters and symbols. In one embodiment, invalid characters or symbols include HTML formatting tags or instructions, such as tags for bold, font type, and font size. Such formatting characters are usually removed because the RSS standard uses text. The removal of such invalid characters and symbols is especially applicable when the RSS data comes from websites containing complex formatting. The syndication server 16, at step 56, then extracts the address links to the original or complete articles. It is noted that if RSS streams were provided from the original content source, then the address links are taken directly from the RSS or XML documents, or both. Otherwise, the importer module 19 uses extraction rules to extract the address links from regular web pages. At step 58, the syndication server 16 uses the extracted address links corresponding to the complete articles to access and extract the full text of the description field, which is typically different and more complete in comparison to the text provided in the RSS data feed. The complete text of each article is stored with in the archive 25 and is associated or linked to the corresponding RSS article. It is noted that the full text of the articles is used to restructure and semantically enrich the content. For example, as will be discussed below, the full text provides more information for characterizing the subject matter of the article, and can be useful when searching for and indexing the article. In a preferred embodiment, the full text is not republished directly to the mobile devices 24. It is noted that the RSS data or portions of the full text, or both, are re-published to the mobile devices 24, after the content is restructured and semantically enriched.

Once the syndication server 16 has obtained the original or complete article, at step 60, the syndication server 16 automatically scans and searches the extracted full text for the publication date, if it is available. At step 62, the syndication server 16 also uses the original or complete articles to search for an image or picture file that is associated to the text in the article. It can be appreciated that there are a number of available methods for determining whether an image or picture is associated to the text in a given article. One example method is using Groovy scripting, wherein "automatically" generated Groovy scripts are the agents that determine and retrieve an image or picture, as well as the most appropriate text for the article. The automatically generated Groovy scripts are generated by a training software application for content extraction. An administrator of the syndication server 16 trains the software application through a graphical user interface (GUI) by selecting components of a web page that are of interest. Interesting components in this case include images or pictures and text describing the images or pictures. Based on the selections made by the administrator, the training software recognizes one or more patterns and automatically generates rules in the form of Groovy scripts that reflect the patterns. The Groovy scripts are then able to determine and retrieve the relevant pictures and corresponding text. The author's name is also extracted from the original or complete text, as per step 64, and then linked to the RSS data. A number of tags are also added based on dictionaries 27, as per step 66. It is noted that the article may already have tags that were added originally by the content creators. These original tags may be kept and added to the generated RSS or XML data. However, in addition or in place of these tags, a number of tags are added based on untyped dictionaries 400. In particular, if any of the words or phrases in the article are found or identified in any of the untyped dictionaries 400, then a tag comprising the header 412 of the identified untyped dictionaries 400 is added to the article. For example, if an article contains the word 'soccer', then the typed 'sports' tag is added to the corresponding RSS or XML data. The extracted data, namely the publication date, image and author's name, associated with each article is stored in the syndication server's archive 25.

It can be appreciated that at this stage, the aggregated content comprises RSS or XML data which has been tagged and characterized by various types of information. The aggregated content is also grouped into streams, wherein each stream has been generated by a feedbot. Furthermore, associated with each RSS data feed is the complete text from the originating article. In a preferred embodiment, only a fraction of the aggregated content is transmitted to mobile devices, for example, based on similarity to a specific keyword. To determine which of the aggregated content should be transmitted to the mobile devices, the aggregated content is next restructured 34.

Figure 6:
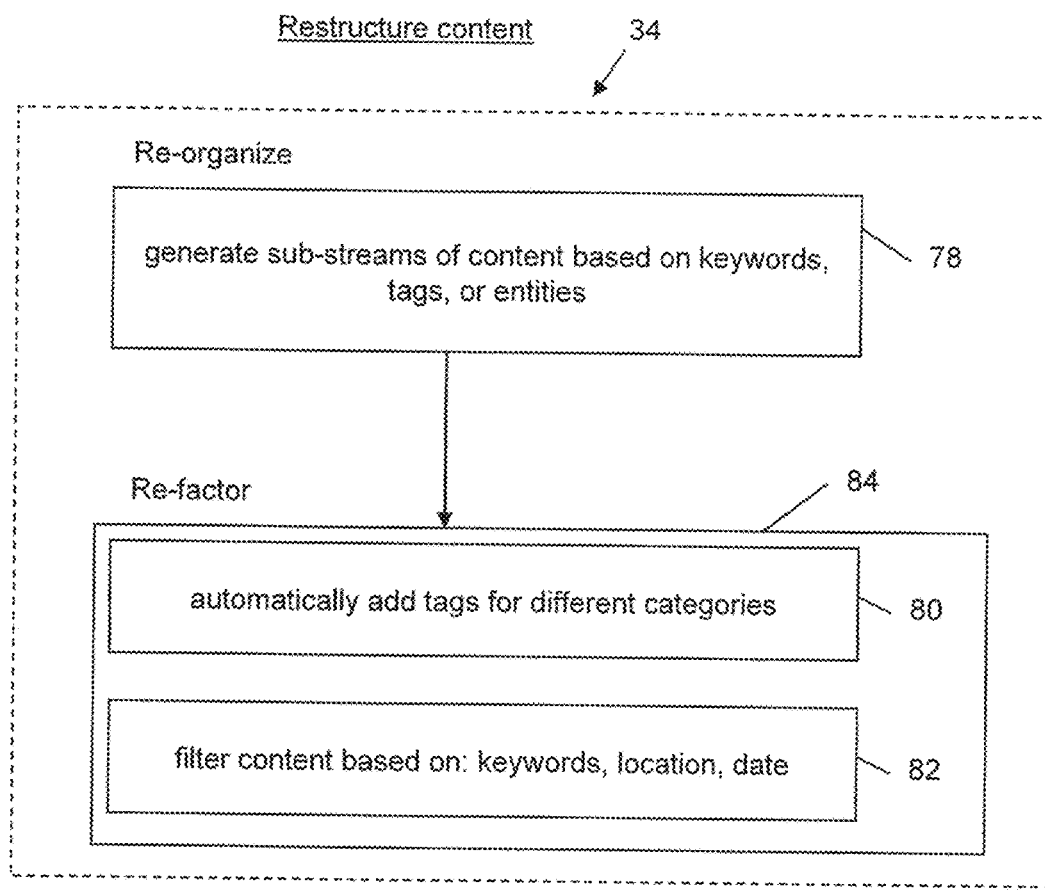
FIG. 6 is a block diagram of the restructuring method in FIG. 3 illustrating exemplary methods of restructuring content.

Turning to FIG. 6, the restructuring process 34 comprises a re-organization step 78 as well as a re-factoring step 84. The re-organization step 78 takes place before the re-factoring step 84. In re-organization 78, the "meaning" of the re-organized information changes. For example, the aggregated content may originally comprise several headline news articles, from which a re-organized news stream titled "swine flu" may be generated from the headline news articles. Re-factoring 84 is the process where content is filtered but information or meaning, for example relating to "swine flu", does not change. Since the aggregated content is not organized or grouped into a readily convenient form, thus, in the re-organization step 78, a query is executed to identify articles with certain keywords so that articles are grouped by more specific topics. These groupings of articles may be referred to as sub-streams, which are further defined groupings of one or more streams of articles generated by the feedbots. The query may search the actual content within the articles or, alternatively, search the tags, both typed and untyped, associated with the articles.

It can be appreciated that the grouping of streams and sub-streams are similar to queries. A broader query provides broader results and, thus, the stream of articles from the broader query is larger in number. A more specific query, for example using more specific words, that is applied to the results generated from the broader query, provides a subset of the results generated from the broader query. In this way, a sub-stream of articles is formed. Based on this organization data, it can be readily understood that that streams and sub-streams may be combined or grouped to form larger streams, and then re-queried to create different sub-streams.

Figure 7:
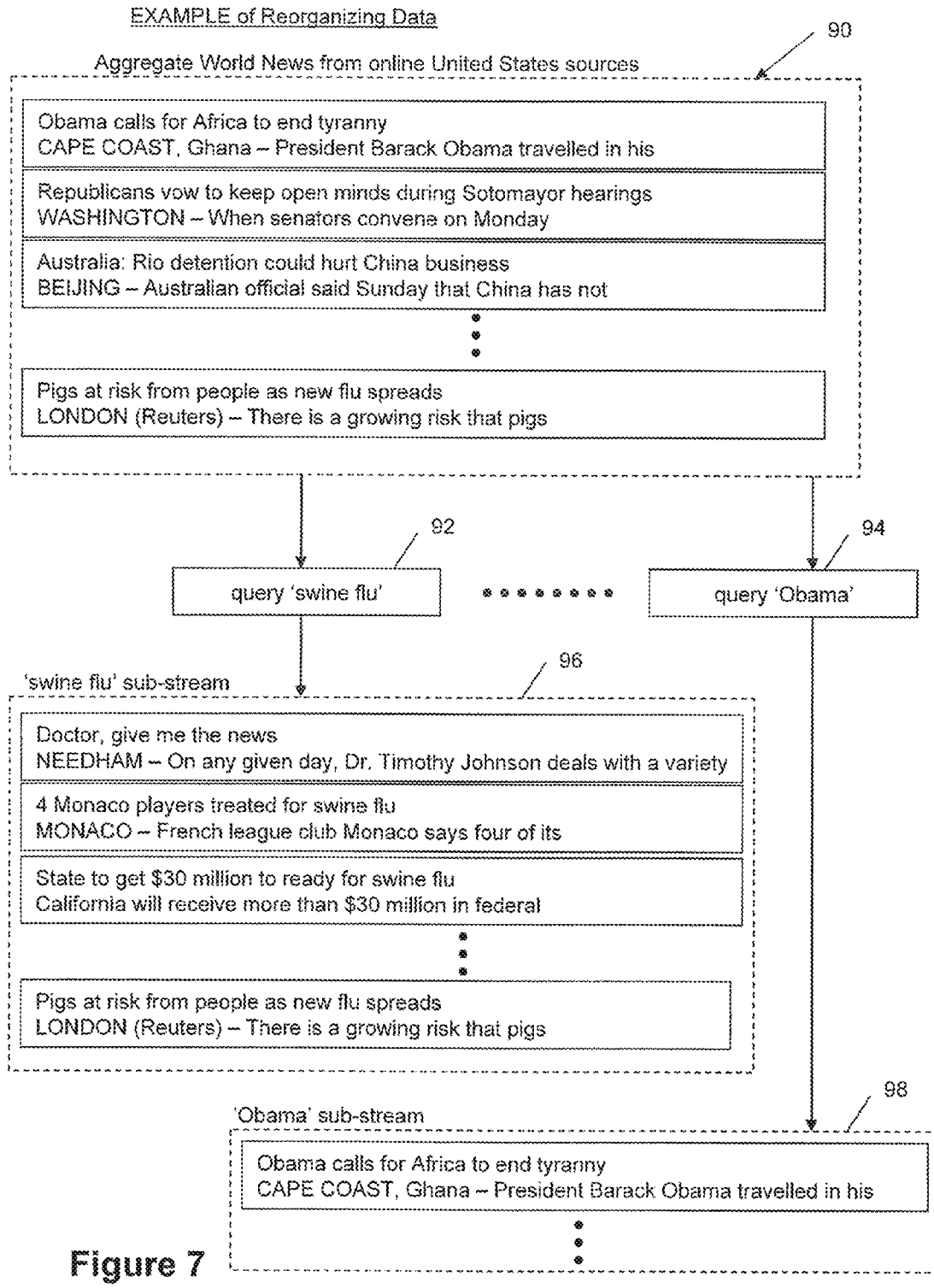
FIG. 7 is a flow diagram of the re-organization method in FIG. 6 illustrating an exemplary reorganization of World News Articles into sub-streams.

For example, turning to FIG. 7, a stream 90 of aggregated articles are shown, which have been collected from all the world news sections of online United States newspapers and magazines. In particular, the stream 90 is created by combining the streams of the all the feedbots which extract data from the world news section of an online United States newspaper. This stream 90 of world news articles can be further organized to topics of interest. A query 92 based on the keywords 'swine flu' is executed and applied to the collection of articles. In other words, articles that contain the words 'swine flu', or articles with tags that contain 'swine flu', or both are identified and added to the 'swine flu' sub-stream. After the 'swine flu' query 92 is executed, a grouping or sub-stream of articles, or content, 96 is formed directed to the topic of 'swine flu'.

It can be readily understood that there can be any number of sub-streams of content based on the keywords. Other non-limiting examples of keywords include 'Obama', 'recycling', and 'union strike'. For example, an 'Obama' query 94 that is performed on the collection 90 of world news articles outputs or produces an 'Obama' sub-stream 98. The keywords for the queries are generated automatically in some cases, and in other cases, manually. In one embodiment, the keywords are the headers 404, 412 of the typed and untyped dictionaries 400, 402. In this way, during the re-organization step 78, the keywords are generated automatically for the queries. In other cases, the keywords are manually provided by an administrator at the syndication server 16 or by a user at the mobile device 24, whereby the administrator or user, or both enters in a keyword to run a text query. Based on a manually entered keyword, a corresponding query and sub-stream comprising the results of the query are generated.

It can also be understood that it is possible to re-organize and re-factor using the same technique (e.g. queries based on tags or manually entered keywords). However, the results between the two approaches differ in the semantics. For example, the aggregated content may be re-organized around the 'swine flu' query and then find the tag 'Obama', The tag 'Obama' is a re-factoring tag. In other words, all the articles from the sub-stream 'swine flu' relate to swine flu. As a subset, the syndication server 16 can re-factor the swine flu articles based on the keyword Obama, in order to find all swine flu articles that mention Obama. In other words, the articles that mention Obama within the context of swine flu are considered a sub-sub-stream.

Sub-streams in the context of re-organization identifies the major sections of the republishing process. Sub-streams in the context of re-factoring identify sub-sub-streams of a re-organized stream. Clustering is yet another grouping within a re-organized stream.

Returning to FIG. 6, after the aggregated content is re-organized into sub-streams, it is then re-factored into further defined sub-streams, for example, sub-sub-streams. In the re-factoring process 84, the semantic meaning of the aggregated content is maintained while further modifying the rules of content aggregation and extraction. There are several approaches in the re-factoring process 85, any of which can be used alone or in combination with each other. These approaches include automatically adding tags for different categories 80 and filtering content 82.

Figure 8:
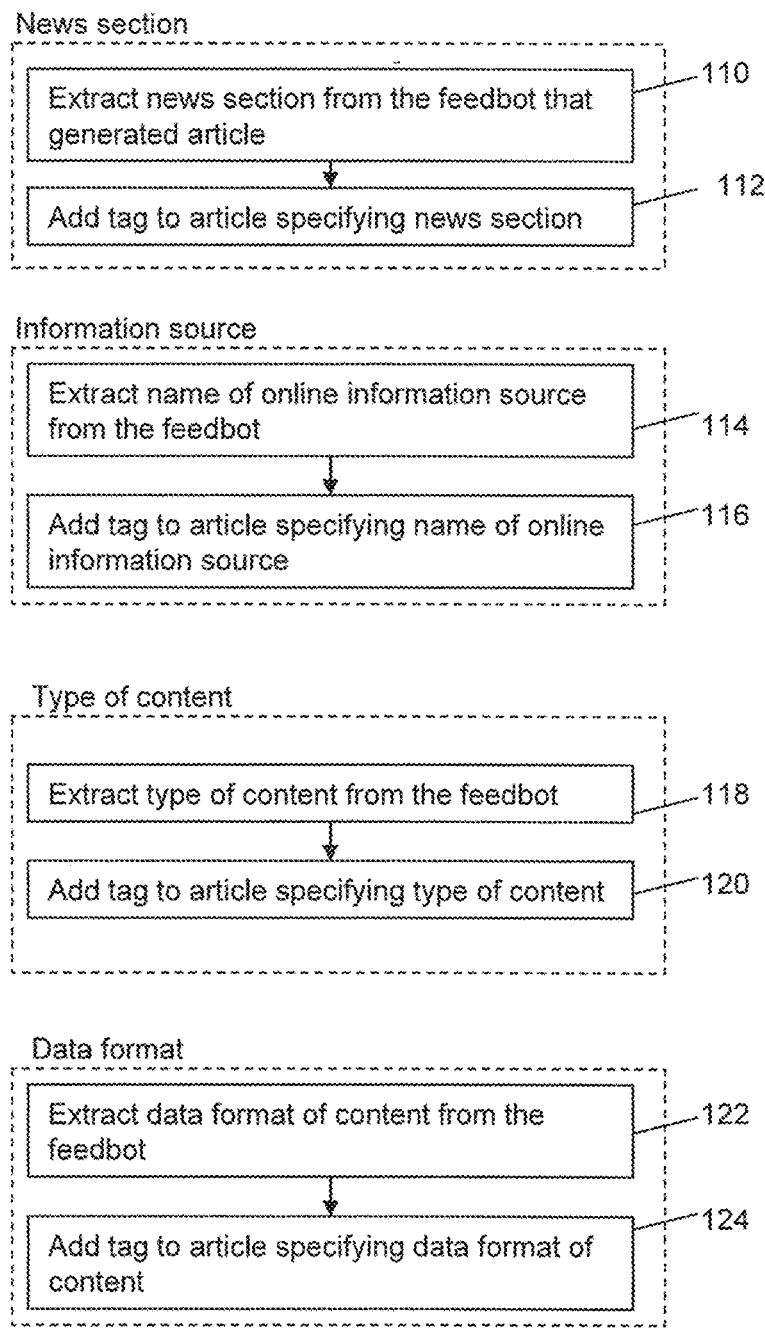
FIG. 8 is a flow diagram of a refactoring method in FIG. 6 illustrating a method of adding tags for different categories.

Turning to FIG. 8, one approach 80 is to automatically create a tag for an article based on the information source. Several tags are created based on several categories. These categories include which section of the news does the article come from; the name of the information source; the type of content or information; and the format of the data. In particular, with respect to the news section category, at step 110, the syndication server 16 extracts the name of the news section from a list of news section names. The news section names are created by the administrators and are typically standard naming conventions across all online information sources. For examples, sports, politics, and world news are examples of such section names. The section name associated with an article can be extracted from the feedbot that generated the article. At step 112, a tag is created for the article specifying the news section. With respect to the information source category, at step 114, the syndication server 16 extracts the name of the online information source from dictionaries associated with the specific feedbot. It can be appreciated that when a feedbot is created by the operator, the operator also provides the name of the online information source. And then at step 116, the extracted information is turned into another tag for the article. With respect to the type of content category, at step 118, the syndication server 16 also extracts the content type from the feedbot that provided that collected the RSS data. In particular, when the operator establishes or configures the feedbot, the operator specifies that the content is of the news type. Other non-limiting examples of content types include personal news and corporate updates. These can be easily customized depending on the user's application of the publishing system. At step 120, the type of content is turned into another tag for the article. With respect to the data format category, at step 122, the syndication server 16 extracts the data format of the content from the feedbots as well. The operator specifies in the feedbot the format of the content, which includes, for example, RSS, Atom, HTML, and Groovy scripting. At step 124, this extracted information is turned into another tag for the article. For example, if an aggregated article is extracted by the "New York Times-World" feedbot, then the following tags are added to the article: world, new york times, news, rss feed. These tags specify the section, online information source, type, and format, respectively. It can be understood that the order in which the tags for each category are created is not limited to any specific order.

Figure 9:
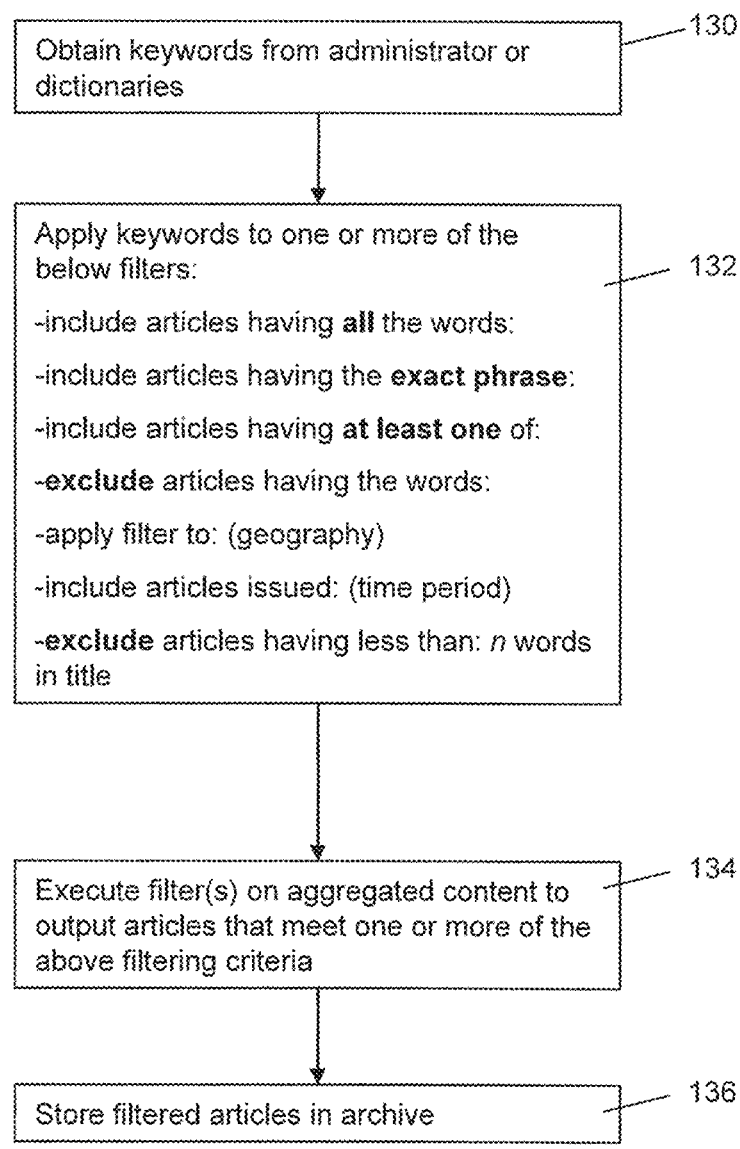
FIG. 9 is a flow diagram of another refactoring method in FIG. 6 illustrating a method of filtering content.

Turning to FIG. 9, in another re-factoring approach, a filtering process 82 is provided to filter content using expressions based on keywords. As per step 130, these keywords are obtained from a repository of keywords, such as those found in the dictionaries 27, that is managed and maintained by an administrator. At step 132, the keywords are used to populate one or more filter expressions. Non-limiting examples of these filter expressions include: 'articles having all the words'; 'articles having the exact phrase'; 'articles having at least one of the words'; and 'exclude articles with the words'. The filter expressions can be applied to information sources within a selected geographical location, as well as can be made to include articles issued within a certain time period. The filter expressions may also include limiting the number of words in the title. At step 134, each of the filters are applied to the aggregated content, so that articles that meet one or more of the criteria set out in the filter expressions are outputted as sub-sub-streams. The sub-sub-streams are saved or stored into an archive in the syndication server's memory 22, as per step 136. Articles that do not meet the criteria are excluded from the archive. The above re-factoring approaches may be used alone or in combination with one another.

After the content is restructured, it is then semantically enriched. In other words, the restructured content in each of the streams, sub-streams and sub-sub-sub streams is automatically provided with additional information to improve its contextual meaning. This process allows for relevant content to be more readily identified, thus preventing large and frequent data transfers between a server and a mobile client.

Figure 10:
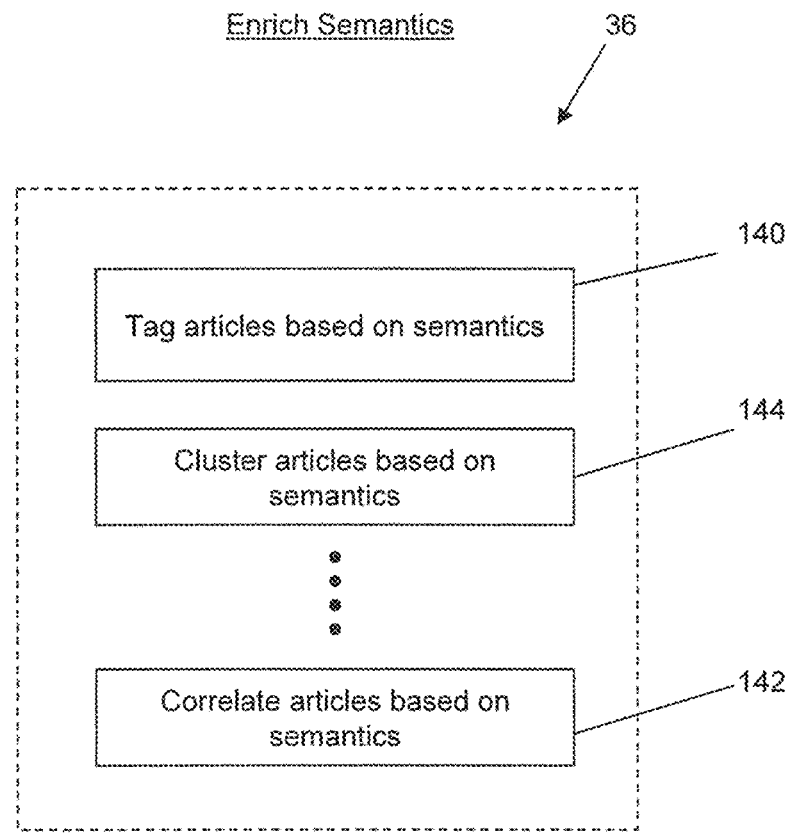
FIG. 10 is a block diagram of the enriching semantics method in FIG. 3 illustrating exemplary methods of enriching semantics.

Turning to FIG. 10, several techniques can be used during the semantic enrichment process 36, including tagging articles based on semantics 140, clustering articles 144 and correlating articles 142. These techniques are described in further detail below. These techniques can be used in combination with each other, or alone.

Figure 11:
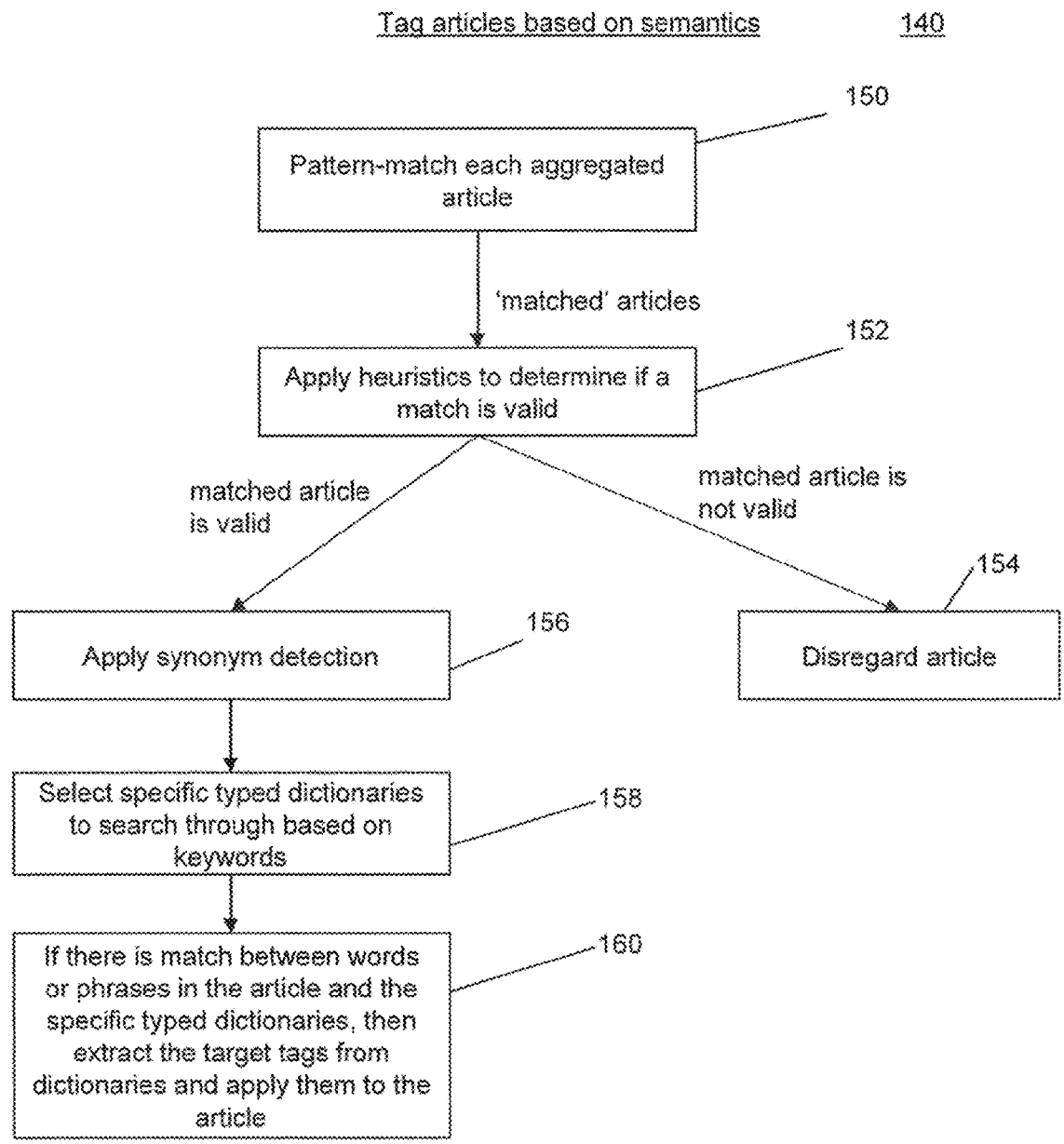
FIG. 11 is a flow diagram of a method in FIG. 10 for tagging articles based on semantics.

Turning to FIG. 11, a process for tagging articles based on semantics 140 is provided. In this process 140, additional information regarding each article is added. First, at step 150, each aggregated article is pattern-matched against a large number of keywords or phrases. As described above, the keyword or phrases are determined based on dictionaries 27 that are developed and maintained by the administrator or by the users, or both. The pattern matching algorithms between the keywords or phrases and the article are preferably based on lexical analysis in parsers based on regular language expressions. Such pattern matching algorithms are well known in the art, and any such algorithms are applicable to the principles described herein. If an article is found to contain a keyword or phrase, then the article is identified as a match.

At step 152, once the match has been identified, one or more heuristic rules determine whether the match is valid. An example of a heuristic rule is related to identifying the part of speech of the keywords of a phrase. For example, the context or meaning of the keywords 'car seats' may be directed to child seating for cars. However, an article may include a phrase 'this car seats seven people' is not a valid match as determined by the heuristics. Another example of heuristics relates to identifying a common noun versus a proper noun. For instance, upper case letters can be used to discriminate the common nouns (e.g. bush) versus the proper noun (e.g. Bush). Sequences of upper cases may also identify name and surname (e.g. George Bush). Names are often matched against a names dictionary (e.g. the George Bush dictionary 418) to identify a situation where the name of a person is being dealt with.

If the matched article is determined not to be valid, then the article is disregarded at step 154. If the matched article is found to be valid, then at step 156, a synonym detection process is applied to decide whether to return the keyword or phrase found in the validly matched article or, instead, to return a synonym of the keyword or phrase. For example, although the matched keyword is 'G. W. Bush', the synonym 'George Bush' could be returned instead. It is noted that the synonyms are obtained from the untyped dictionaries 402. As discussed earlier, with respect to FIG. 2, if any instances of 'Bush George', 'President Bush' or 'G. W. Bush' are found, then these may be replaced with the target tag 'George Bush'.

Continuing with FIG. 11, after the articles are identified as matches and validated, then tags are attached to the article based on one or more specific typed dictionaries 428. Thus, at step 158, the syndication server 16 searches through the specific typed dictionaries 428 to see if any words in the articles correspond to those words in any of the specific typed dictionaries 428. At step 160, if there is a match between a word in the article and a word in a specific typed dictionary 428, the corresponding target tag of the specific typed dictionary is applied to the article. In this way, the matching rules for the specific typed tags reduce the ambiguity of the article. Such rules may be referred to as disambiguation algorithms. Non-limiting examples of the specific typed dictionaries 428 include the following: 'companies' dictionary; 'cometics' dictionary; 'SUVs' dictionary; 'peoplePolitics' dictionary; 'sportAthletes' dictionary; 'worldPolitics' dictionary; and 'events' dictionary. It is noted that typically one or more tags may be added to an article.

Another technique for semantic enrichment is clustering, which extracts popular or "hot" topics from the collection of aggregated articles. In other words, clustering identifies the most highly discussed or reported subjects within a given time period. The clustering process is described below.

Figure 12:
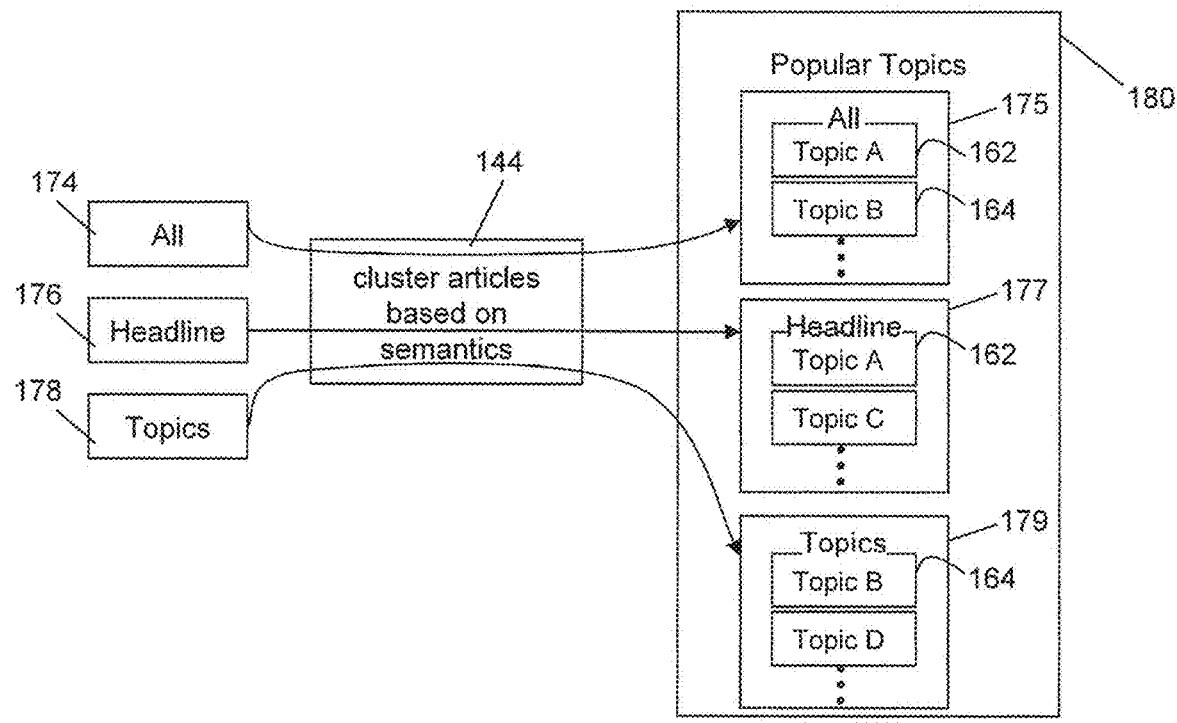
FIG. 12 is a block diagram of clustering articles from input feeds and outputting popular topics.

Turning to FIG. 12, the clustering technique 144 retrieves multiple articles from different streams, sub-streams, sub-sub-streams, or combinations thereof and clusters the articles into different topics, and order the topics according to the popularity or relevance of a topic. The higher number of articles that are clustered under a topic, the more popular or relevant the topic becomes. The inputs into the clustering algorithm 144 are an 'All' feed 174, 'Headline' feed 176, and 'Topics' feed 178. The 'All' feed 174 includes all sub-sub-streams (e.g. refactored groupings of articles) across all different news sections (e.g. U.S. News, UK news, sports, politics, etc.) that are stored in the archive 25. The 'Topics' feed 178 includes sub-sub-streams that are grouped into the news sections (e.g. U.S. News, UK news, sports, politics, etc.), wherein the articles queried are all current. For example, the articles within the 'Topics' feed 178 have been published within the last week, so that all articles older than a week are excluded from the feed 178. The 'Headline' feed 176 includes only sub-sub-streams that originate from the headlines section or the front-page section of the newspapers. Thus, the articles within feed 176 are considered to be more main stream to the public's interest.

Continuing with FIG. 12, the articles in the feeds 174, 176, 178 are clustered together using a clustering technique 144, which outputs a feed of popular or relevant topics 180. The output feed 180 is divided into several output feeds 175, 177, 179. Popular topics contain articles which are subsets of those found within each of the output feeds 175, 177, 179. The popular topics are also ordered according to popularity, so that the most popular topics are displayed most prominently. Similarly, the articles that have been clustered within each topic are ordered according to popularity, so that the most popular article is displayed most prominently. For example, 'Topic A' 162 is the most popular topic within the 'All' output feed 175, and 'Topic B' 164 is the second most popular topic within the 'All' output feed 175. 'Topic A' 162 may also be the most popular topic within the 'Headline' output feed 177. However, in the 'Topics' output feed 179, 'Topic B' 164 may be the most popular topic. As will be discussed further below, the topics are based on keywords or target tags stored in the dictionaries 27, as well keywords provided by the user. In other words, 'Topic A' 162 and 'Topic B' 164 are keywords or phrases provided by the user or stored in the dictionaries 27.

Figure 13:
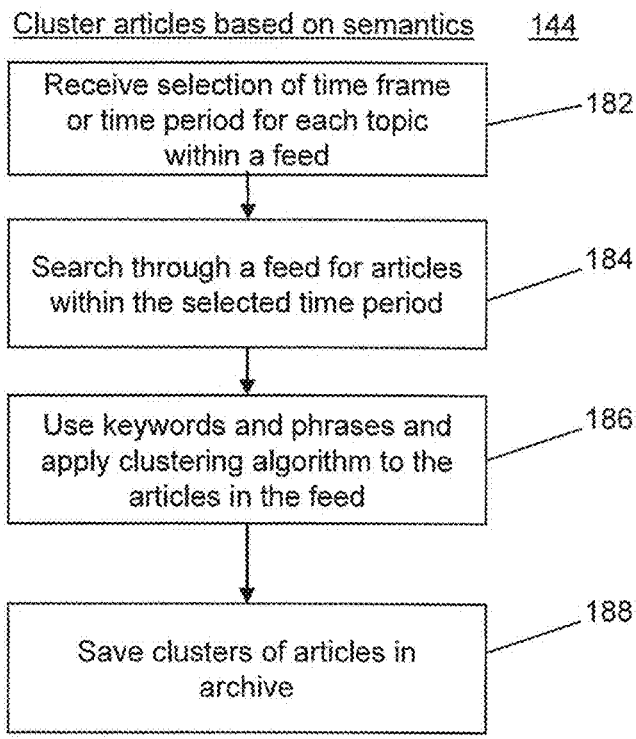
FIG. 13 is a flow diagram of another method in FIG. 10 for clustering articles based on semantics and using the input feeds in FIG. 12.

Turning to FIG. 13, a process for clustering articles 144 is provided. At step 182, first, a time frame or time period is selected for each topic within the feed. All articles published within the selected time period are stored into the syndication server's memory 22 as an archive. Thus, only articles within the most recent selected time period, for example the last 24 hours, are maintained in the archive. For example, when considering articles from the 'World News' section, a 24 hour time period is selected. Thus, articles related to world news that were published within the last 24 hours are stored in the archive.

At step 184, the syndication server 16 searches through a feed (e.g. feeds 174, 176, 178) for the articles within a certain time period or time frame. The time period or time frame is established by the administrator and is typically selected to be convenient for the final user. For example, the final users prefer recent news and are thus interested in what has been published online in the most recent 24 hour period (e.g. starting now and moving back 24 hours). Other final users may want news within a certain topic or area that is considered the most popular or interesting over the past week or past month. The articles outputted from step 184 are then used as inputs into a clustering algorithm at step 186. The clustering algorithm applies a number of keywords or phrases to the articles in the feed and identifies which of the keywords are popular or 'hot' topics within the feed. The keywords or phrases are provided from the user or retrieved from the dictionaries 27, or both. The popular articles are clustered together into topics (e.g. 'Topic A' 162 and 'Topic B' 164) and are saved in the 'popular topics' feed 180 in the syndication server's memory 22, as per step 188.

As discussed above, each topic is identified by a keyword or phrase. The process of determining the popularity of the keyword or phrase depends in part on how often it is used in the complete text of the articles. In one embodiment, the process of determining which articles should be clustered under a keyword or phrase (e.g. a topic) and the process of determining the popularity of a topic are carried out using the Carrot²™ algorithm. The Carrot²™ algorithm uses a statistics methodology developed at the University of Poznam in Poland. The Carrot²™ is an open source framework for querying textual data. It employs the Lingo clustering algorithm that groups search results based on their relation to a topic. For example, if 'apache' is a keyword, then it will cluster articles according to related topics such as 'apache helicopter', 'apache reserve', etc. In another example, if 'green' is a keyword, then it will cluster articles according to related topics such as 'green news', 'living green', 'political party', 'green building', etc. It can thus be seen that the clusters of related topics are based on the keyword or phrase. The related topics are prioritized according to popularity. In other words, the more articles that are clustered under a related topic, the more popular the related topic is considered to be. The Carrot²™ algorithm uses non-hierarchal or flattened clustering techniques. However, it can be appreciated that various other clustering algorithms and tools can be used to identify the popular topic and the related articles thereof, as per step 186.

It is noted that a number of common words are also filtered out, as they are considered noise, during the clustering process. In the clustering process, the syndication server 16 reviews a predetermined number of articles from the 'topics' feed 178 and evaluates the first set of characters in the title and text combined. In one example setting, the syndication server reviews at most 200 articles, and then evaluates the initial 240 characters of the title and text combined in each of the articles. Based on the clustering algorithm, the articles extracted from the collection of 200 articles are stored into the 'popular topics' feed 180.

Continuing with the semantic enrichment, another technique that is employed is correlation. In the correlation process 146, articles are correlated to one or more other articles that are considered relevant.

Figure 14:
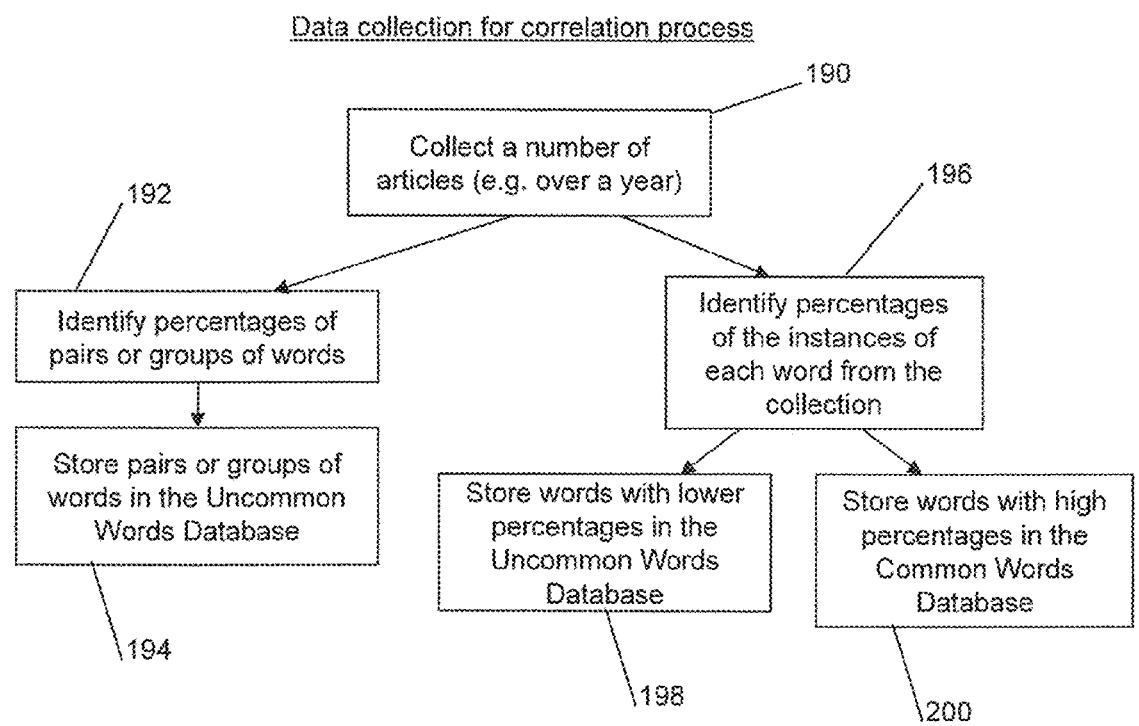
FIG. 14 is a flow diagram of a method for identifying common and uncommon words.

Before the correlation process 146 takes place, first some historical data is gathered or retrieved to assist in the correlation. One embodiment of determining common and uncommon words is provided in FIG. 14, although other methods for doing the same are equally applicable to the processes described herein. Turning to FIG. 14, at step 190, a body of news articles are collected over a long period of time (e.g. over a year). The collection of articles is used as input data to tally up and determine the frequency of each of the words. The frequency of each word is compared with the frequency of other words to find a relative percentage. At step 196, the percentage of the number of times that each word was used relative to all the other words in the collection of articles is calculated. At step 198, words that are characterized with lower percentages are considered uncommon words. These uncommon words are stored in an uncommon words database, for example, on the syndication server's memory 22. The uncommon words may also be used as words in the dictionaries 27. Conversely, at step 200, words with higher percentages are considered as common words. These common words are stored in a common words database, for example, also on the syndication server's memory 22.

Similarly, the collection of articles from step 190 can be used to identify the number of times certain pairs or groups of words are used together in an article, as per step 192. In other words, if a certain pair of words coexist in a low percentage of articles, then the certain pair of words would be considered to be highly correlated. Thus, at step 194, the pairs or groups of words are stored in the uncommon words database.

Figure 15:
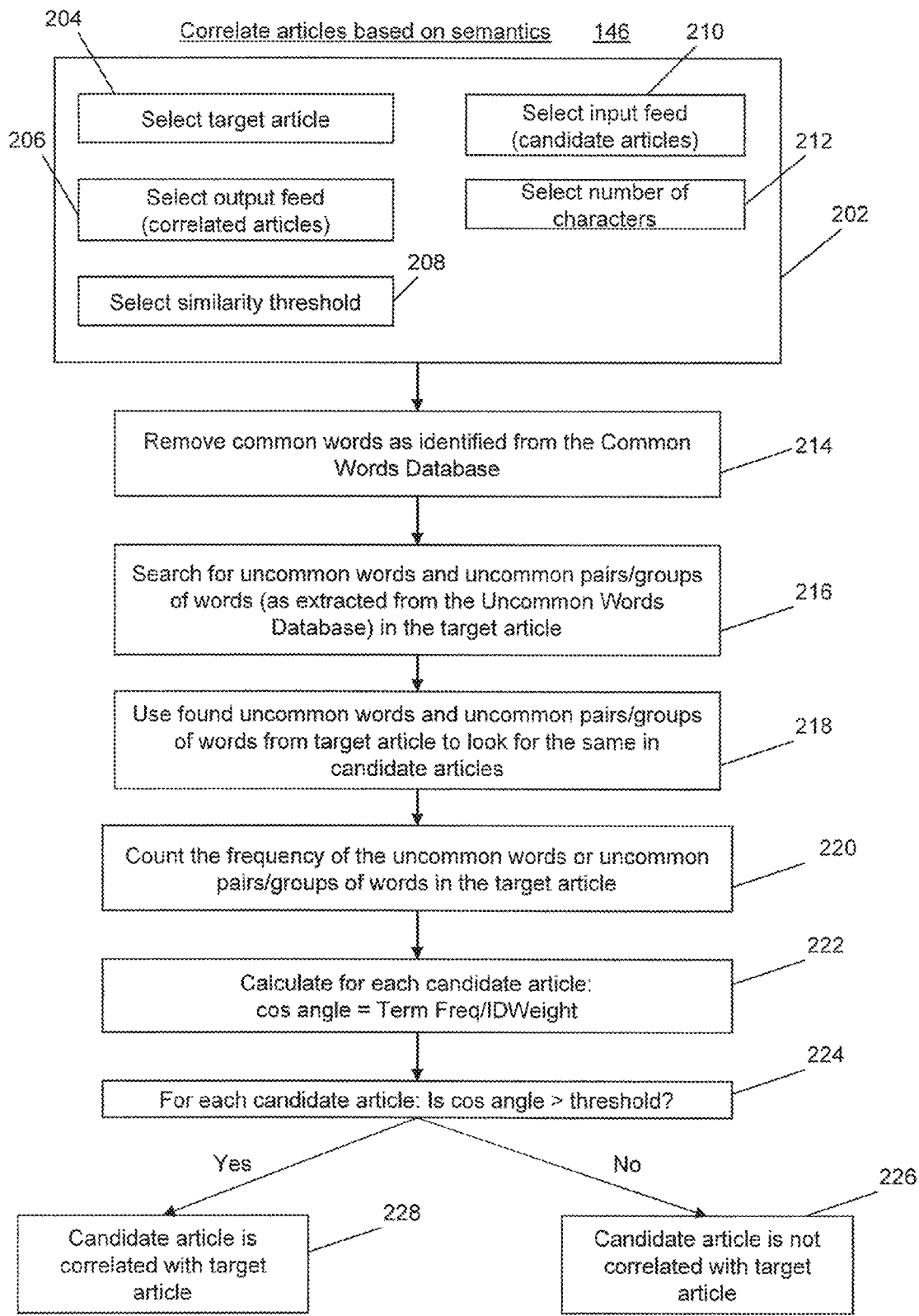
FIG. 15 is a flow diagram of another method in FIG. 10 for correlating articles based on semantics and using the identified uncommon words in FIG. 14.

Turning to FIG. 15, the correlation process 146 based on semantics is provided. As per step 202, a number of parameters for the correlations must be first identified. These include the step 204 of selecting a target article. The target article is the article to which one or more candidate articles are compared with. In one embodiment, the target article could be the most popular article within a certain stream. Candidate articles that are similar enough to the target article are correlated with the target article. Thus, as per step 210, an input feed of candidate articles must be specified wherein, for example, the input feed comprises one or more sub-substreams generated from the refactoring process. At step 206, the output feed is specified, whereby correlated articles are made available through the output feed. It can be appreciated that the output feed is another group of articles, which can also be referred to as a stream. Other parameters include selecting the number of characters to use for similarity calculations 212, as well as selecting a similarity threshold level above which two articles are declared similar 208. The number of characters refer to the quantity of characters that are reviewed in each article. Typically the first three-hundred to four-hundred characters of an article are reviewed in order to sufficiently identify the main topic. In some instances, correlating the articles based on the entire text may lead to confusion and undesirable results. The similarity thresholds usually comprise a real number between 0 and 1.0 and vary depending on text collections. The similarity threshold is determined in part according to the judgment of the administrator, who may take into account the target article and specified input feed or feeds.

Once the parameters have been defined, stop words and common words are eliminated or removed from the target article and the other candidate articles, as per step 214. Stemming algorithms are also applied to remove plurals and verb declinations of the common words. It can be readily understood that stemming is the process for reducing inflected (or sometimes derived) words to their stem, base or root form—generally a written word form. The stem is not required to be identical to the morphological root of the word, and it is usually sufficient that related words map to the same stem, even if this stem is not in itself a valid root. It can be appreciated that the common words were identified in the earlier process corresponding to FIG. 14, whereby the common words were stored in the common words database.

Continuing with FIG. 15, in the target article, a search for uncommon words and uncommon pairs/group of words is performed, as per step 216. The uncommon words are extracted from the uncommon words database. The uncommon words are used to identify keywords in the target article that are more likely to distinguish it over other candidate articles. Then, at step 218, the syndication server 16 uses the uncommon words and uncommon pairs or groups of words that were found in the target article to perform a search in the candidate articles. If a candidate article has a sufficient number of the same uncommon words or a sufficient number of uncommon pairs or groups of words, then the candidate article is considered to be correlated with the target article. Thus, at step 220, the syndication server 16 counts the frequency of the found uncommon words and the uncommon pairs or groups of words in the candidate article. For each candidate article, the 'cosine angle' is calculated, whereby cos angle=Term Frequency/ID Weight, as per step 222. The higher the cosine angle, the higher the correlation. It can be appreciated that the cosine angle is a numerical index, or correlation value, to indicate the correlation between a candidate article and the target article. In one embodiment, the ID weight is based on the uncommon word's percentage relative to the body of articles collected over a year. Therefore, the less the uncommon word has been used in the past, the lower the percentage, and, thus, the higher the cosine angle. The term frequency is the frequency of the uncommon word in the candidate article. At step 224, the cosine angle for each candidate article is compared against the established threshold. If the cosine angle is greater than the threshold, or if it is equal to the threshold, then at step 228, the candidate article is correlated with the target article. If the cosine angle is lower than the threshold, then at step 226, the candidate article is not correlated with the target article.

After the content has been semantically enriched, it is then republished. Republishing means that the content is published again, in this embodiment, after certain aspects of the content, such as the organization and semantics, have been modified. In one embodiment, the initial step of republishing the content is to store the content on the syndication server's cache 39.

Figure 16:
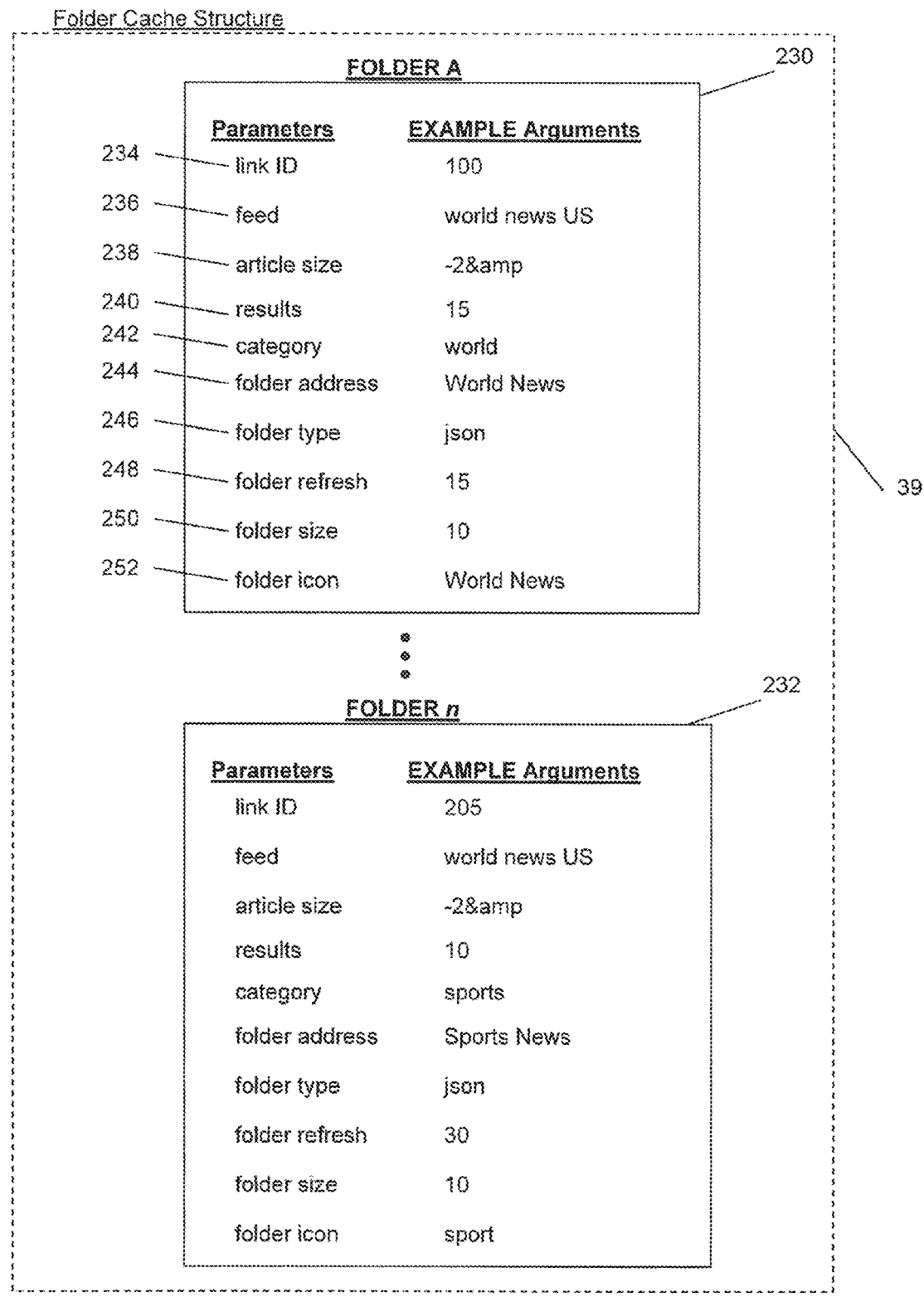
FIG. 16 is a block diagram of an exemplary configuration of a folder cache structure in the syndication server for republishing content.

Turning to FIG. 16, an exemplary configuration of a cache 39 on the syndication server 16 is provided to allow for frequent refreshing of content. It can be appreciated that the cache 39 may be part of the syndication server's memory 22 or may be a separate memory device in the syndication server 16. The server cache 39 facilitates republishing to a large number of clients, or mobile devices. In the server cache 39 a number of folders 230, 232 are created for different feeds. In addition to updated content, each of the folders 230, 232 contain parameters as to how often or at what time intervals the content should be refreshed, among other things. Examples of parameters include the following: link ID 234, feed 236, article size 238, results 240, category 242, folder address 244, folder type 246, folder refresh 248, folder size 250, and folder icon 252. Taking for example Folder A 230, the link ID 234 is given the numeral '100' and denotes a way to quickly identify the folder. The feed parameter 236 identifies the source of the content that is to be stored in Folder A 230. In this example, the argument for the feed parameter 236 is 'world news US'. The article size parameter 238 accepts the argument −2&, which indicated that up to 2×128=256 characters can be stored in cache with respect to each article. The results parameter 240 accepts a number such as 15, which means that there are up to 15 articles stored in Folder A 230. The factors for determining which articles are stored in a cache folder (e.g. Folder A 230) depend on the type of news. For a folder with the most up-to-date news, then the most recent articles are stored in that certain folder. For another folder that is topical, the most popular articles within the topic are stored in that topical folder. The category parameter 242 accepts a text-based argument, such as 'world', since world news is stored in Folder A 230. Thus, the address of the folder 242 specified 'World News'. The folder type 244 reflects the data format in which the content is stored in the folder. Folder A 234 stored data in the Java script object notation (JSON) format. The values specified for each of the parameters may be customized to meet the user's needs as well the mobile device's performance capabilities, such as connectivity capabilities.

Continuing with FIG. 16, Folder A 230 also includes a folder refresh rate 248, whereby Folder A 230 is updated with new content from the world news US substream every fifteen minutes. The folder size parameter 250 indicates the number of articles within each folder that can be sent to a mobile device in a single transmission. In other words, the folder size parameter is always less than or equal to the results parameter. In the example shown, the folder size parameter is ten and the results parameter is fifteen, which means that up to ten of the fifteen articles in Folder A 230 may be transmitted to a mobile device 24 during a transmission. This advantageously reduces and controls the amount of data that is exchanged between the syndication server 16 and a mobile device 24, thereby increasing the speed at which data is provided. Further, where the results parameter 240 is larger than the folder size parameter 250, the articles in Folder A 230 that have not been transmitted remain in the cache 39. These articles that have not been transmitted can advantageously be quickly retrieved from the cache 39 by a mobile device 24, should the user desire to obtain more articles from Folder A 230. The folder icon parameter 252 is also specified and, in this case, is World News'. These cache folders are kept up to date and are made available on a public URL address, so that they can be remotely accessed from any compliant HTTP client over the internet.

Figure 17:
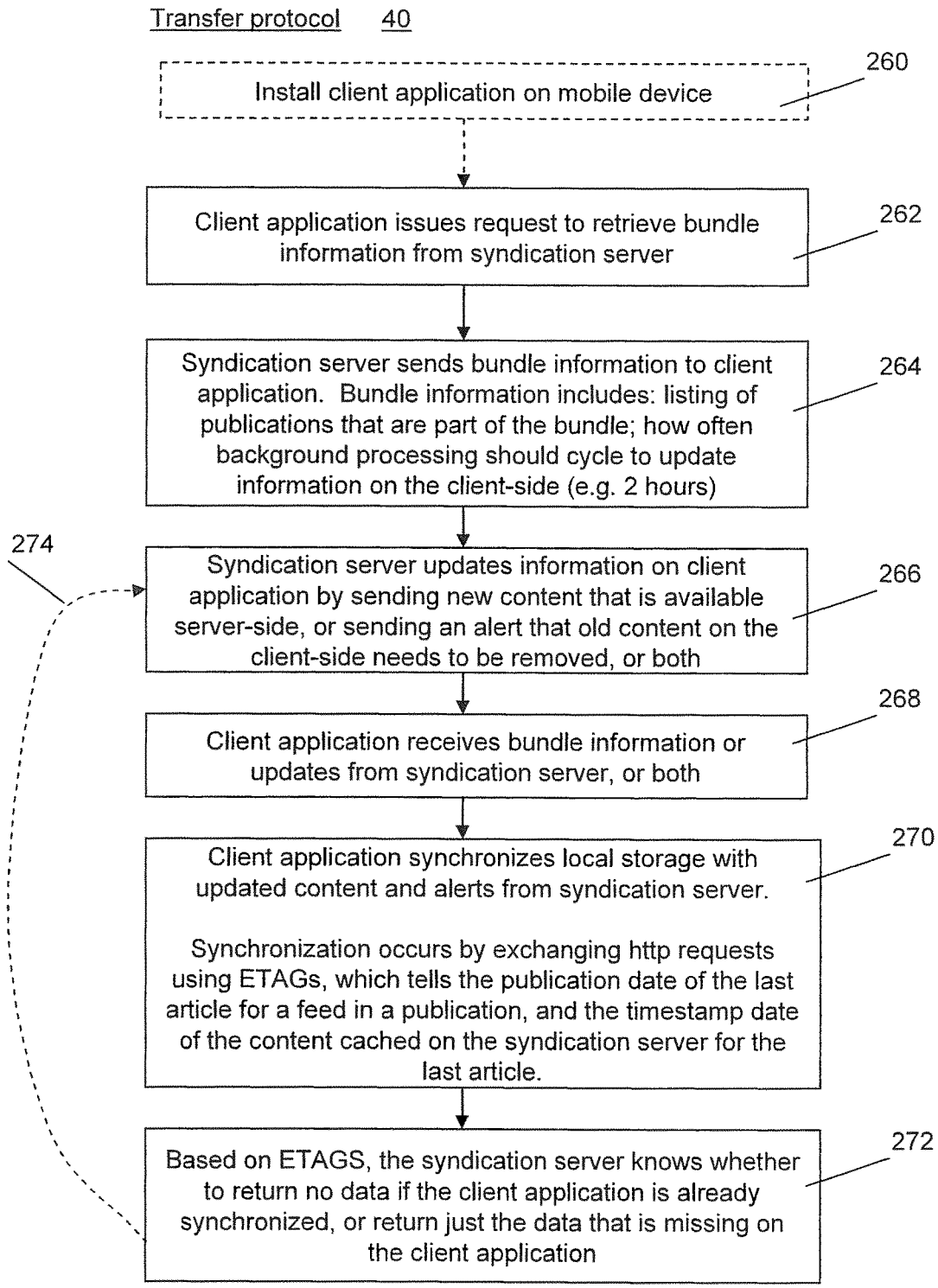
FIG. 17 is a flow diagram of the transfer protocol in FIG. 3.

Turning to FIG. 17, a transfer protocol 40, also referred to as a smart protocol, is used to transfer the articles stored on the syndication server's cache 231 to one more mobile devices 24. As discussed above, the mobile devices 24 each have a client application 26 for interacting with the transfer protocol 40. As part of the initialization process for the transfer protocol, it can be readily understood that the client application 26 will be installed onto a mobile device 24, as per step 260. In FIG. 17, step 260 is shown in dotted lines to represent that it is not necessary if the client application 26 has been previously installed. After the client application 26 is installed, the client application 26 sends a request to the syndication server 16 to retrieve information bundle from the syndication server 16, as per step 262. The request may specify which types of news the user desires to receive. Alternatively, the request may be more general and request access to all available news. In response, at step 264, the syndication server 16 sends the information bundle to the client application 26 on the mobile device 24. The information bundle identifies the listing of publications that are part of the bundle, for example US News, UK News and Canada News. The information bundle may also include how often the transfer protocol will be executed in order to update the mobile device 24 with current information. For example, the information may contain a time parameter of 2 hours, which indicates that at every 2-hour period the client can be updated with current content. It can be appreciated that the initialization of the transfer protocol 40 includes steps 260, 262 and 264. These steps occur may occur one or more times and do not need to be executed every time content is transferred between the syndication server 16 and the mobile device 24.

Continuing with FIG. 17, once the information bundle has been provided to the client application 26, then at step 266, the syndication server 16 updates the information on the client application 26 or mobile device 24 by sending new content that is available on the cache 131. In addition, or in the alternative, the syndication server 16 also retrieves or keeps track of the content that the mobile device 24 currently has stored on its storage or memory 28. If there is old content on the mobile device's storage or memory 28, then the syndication server 16 sends an alert to the client application 26 stating that the content on the mobile device 24 needs to be removed. As per step 268, the information bundle or updates from the syndication server 16, or both are received by the client application 26. In one embodiment, the content is transferred in JSON format and is compressed. At step 270, the client application synchronizes the mobile device's local storage 28 with content from the cache 131. The transfer protocol 40 facilitates the exchange of data between the syndication server 16 and the client application 26 on the mobile device 24. The synchronization is carried out by the client application 26 exchanging HTTP requests, also called ETags, with the syndications server 16. The HTTP requests are for requesting updated content from the syndication server. The HTTP requests also convey to the syndication server 16 the publication date of the most recent article stored on the mobile device's local storage 28 for a feed in a publication (e.g. world, sports, and politics). The HTTP requests also allows the syndication server 16 to track the timestamp date of the content cached on the syndication server 16 for the given publication. At step 272, the syndication server 16 uses the publication date and the timestamp date to determine whether to return no data if the client application 26 is already synchronized or up-to-date, or return just the data that the client application is missing. This has the advantage of reducing the volume of transferred data, since only the difference in the update data would be sent to the client application 26. As shown by the dotted line 274, the process of updating the client application can repeat, starting with step 266.

Figure 18:
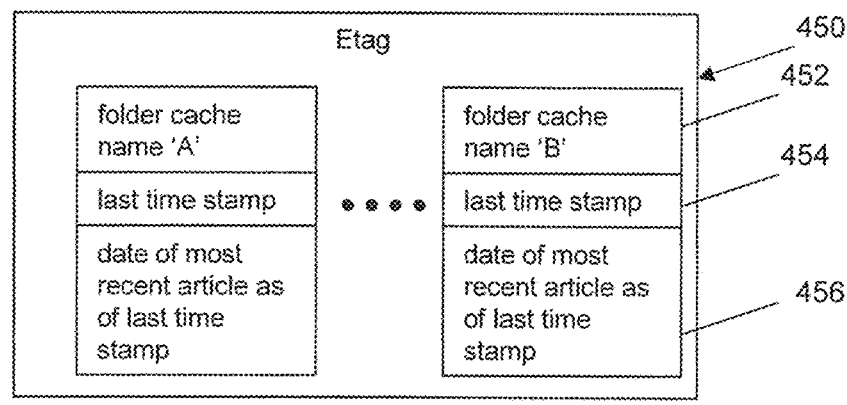
FIG. 18 is a block diagram of an exemplary configuration of an ETag.
Figure 19:
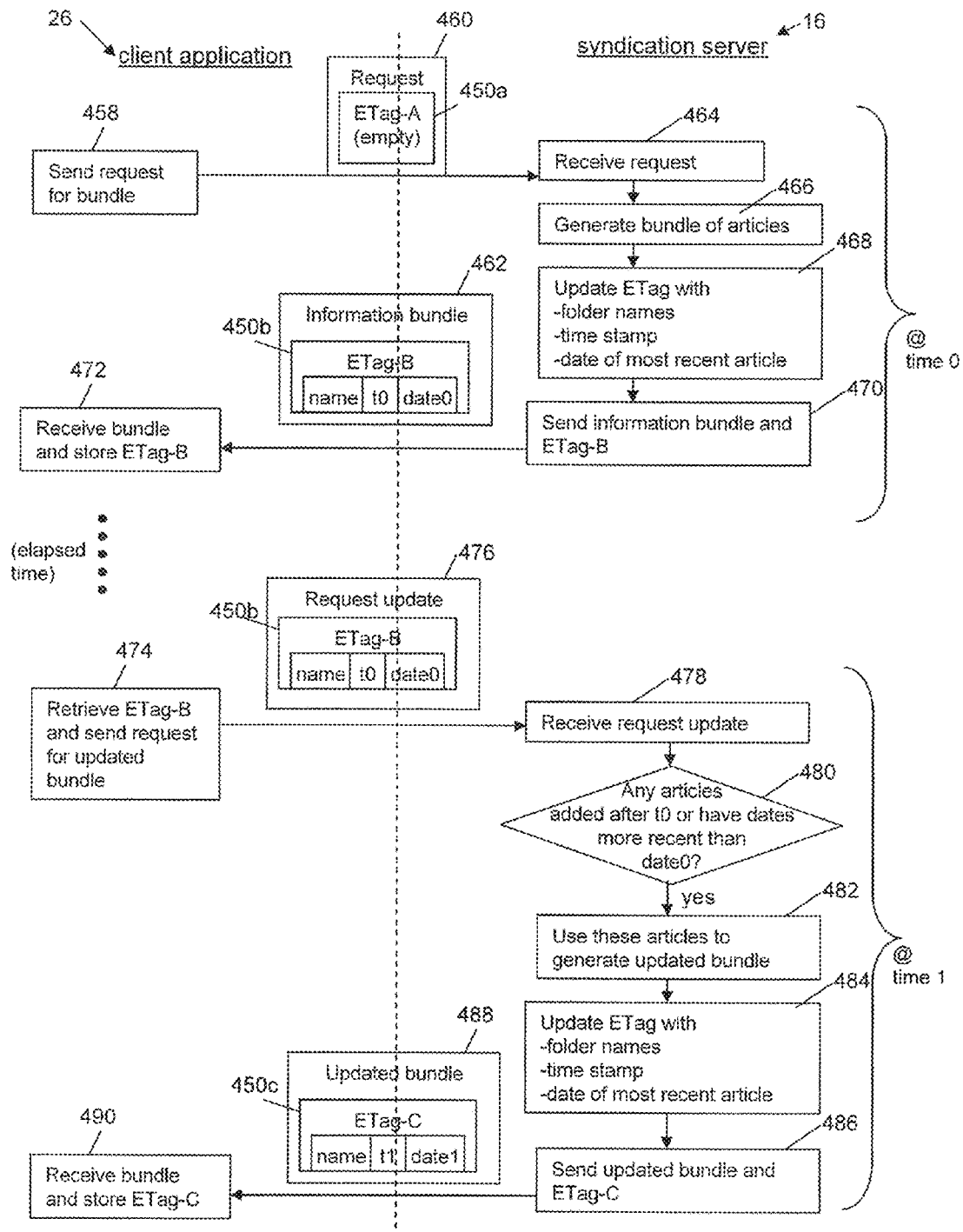
FIG. 19 is a flow diagram of another embodiment of the transfer protocol using ETags.

An exemplary process of the exchange of HTTP requests, herein after referred to as ETags, is shown in FIGS. 18 and 19. An ETag 450 contains information such as the time stamp 454 of when data was last transmitted from a certain folder in the syndication server's cache 39 to the mobile device 24; the name 452 of the certain folder in the cache 39; and, the date 456 of the most recent article in the cache 39 as of the last time stamp 454. It can be appreciated that an ETag 450 may track multiple folders (e.g. folders 230, 232) and that for each respective folder name 452 (e.g. folder name 'A' and folder name 'B'), there is an associated time stamp 454 and date 456 of the most recent article in the respective folder. In another embodiment, not shown here, each ETag 450 only tracks a single folder, so that if a client application 26 is tracking multiple folders, then multiple ETags 450 are exchanged.

There are different instances of the ETags 450, whereby the information in an ETag 450 changes as the mobile device 24 and syndication server 16 exchange information back and forth with one another. Therefore, for clarity, different instances of the ETags 450 are marked with the suffix 'a', 'b', 'c', etc.

Figure 20:
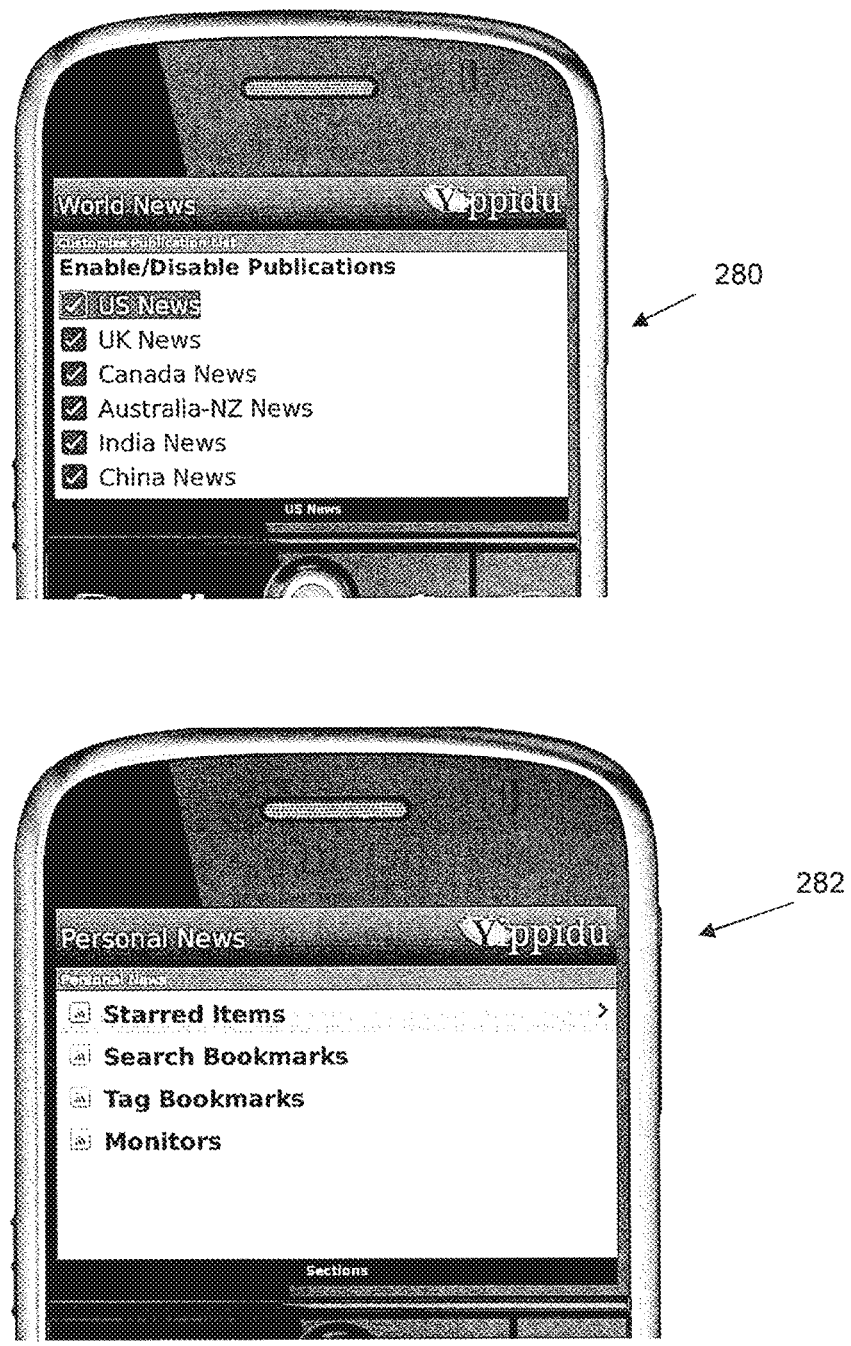
FIG. 20 is an exemplary GUI on a mobile device illustrating personalization features for receiving aggregated content.

At step 458, when the client application 26 sends a request for an information bundle 460, an empty ETag 450a is included with the request 460. An empty ETag 450a indicates that information regarding the last known status of the articles in the cache 39 is not available, in this case, because the client application 26 and syndication server 16 did not previously have any communication. At step 464, the syndication server 16 receives the request 460 and ETag 450a. As described above, the request 460 may indicate that the user would like to receive articles from certain folders, or from all the folders in the cache 39. At step 466, the syndications server 16, retrieves the articles and associated data (e.g. tags, correlated articles, online links to complete articles, etc.) from one or more folders in the cache 39. In this way, an information bundle is generated. At step 468, the syndication server 16 updates the empty ETag 450a with the name of a folder accessed, the time at which a folder were accessed, and the date of the most recent article in a folder that is to be sent in the information bundle 462. The information bundle 462 and updated ETag 450b are sent to the mobile device's client application 26 at step 470. As can be seen in FIG. 20, steps 466, 468, 470 occur at a initial time represented as 'time 0'. Thus ETag 450b contains the time stamp 't0', which represents 'time 0', and the date 'date 0' of the most recent article that is current as of 'time 0'. At step 472, the mobile device 24 receives the information bundle 462 and ETag 450b, and then stores the ETag 450b.

Continuing with FIG. 19, the client application 26 will likely request more up-to-date articles at a later date or time, for example, automatically at a predetermined schedule, or upon a user command. At step 474, the mobile device's client application 26 retrieves the stored ETag 450b and sends a request for an updated bundle 476, which includes the ETag 450b. At step 478, the syndication server 16 receives the request for an update 476. Then, at step 480, the syndication server determines which, if any, of the articles in the folder were added after the time stamp 't0' or have publication dates after the date 'date 0'. Articles that meet at least one of these time or date conditions are considered delta articles, and are used to generate an updated bundle, as per step 282. At step 484, the syndications server 16 updates the older ETag 450b to reflect the current time, denoted as time 1'. In particular the updated ETag 450c includes an updated time stamp 't1' and date 'date1' of the most recent article as of 'time 1'. The syndication server 16 at step 486 sends the updated bundle 488 and ETag 450c to the client application 26. At step 490, the client application 26 receives the updated bundle 488 and stores the updated ETag 450c. It can be appreciated that the ETag 450c will be sent to syndication server 16 in the next request for more information.

The use of ETags 450 advantageously identifies which of the articles have not yet been transferred to the mobile device 24, thereby reducing the volume of data flow between the mobile device 24 and the syndication server 16 while providing the user with the desired articles. Thus, the transfer protocol 40 increase efficiency of the overall system and method. It is noted that known polling techniques and real-time push protocols are applicable to the principles of the transfer protocol 40 described herein.

Turning to FIG. 20, the client application 26 also has a graphical user interface (GUI) to allow a user to select which publications and topics are of interest to the user. These publications and topics of interest are sent from the client application 26 to the syndication server 16 in the form of requests (e.g. requests 460 and 476). Using the mobile device's interface (e.g. buttons, keyboard, scrolling ball, scrolling wheel, or touch screen), the user can select the publications and topics for synchronization. For example, turning to screen 280, the user can enable or disable certain publications for synchronization in the 'World News' feed. In screen 280, the user has enabled the publications from many countries, so that news articles from those countries may be sent to the mobile device 24. In yet another GUI screen 282, the client application 26 also allows for a number of other personalization features including saving a copy of an article, also referred herein as 'starring an item' and bookmarking an article. The user can also search through bookmarks as well as monitor incoming news. In particular, when monitoring incoming news, the user can provide keywords to filter incoming news and create collections of articles that match the keywords provided.

Figure 21:
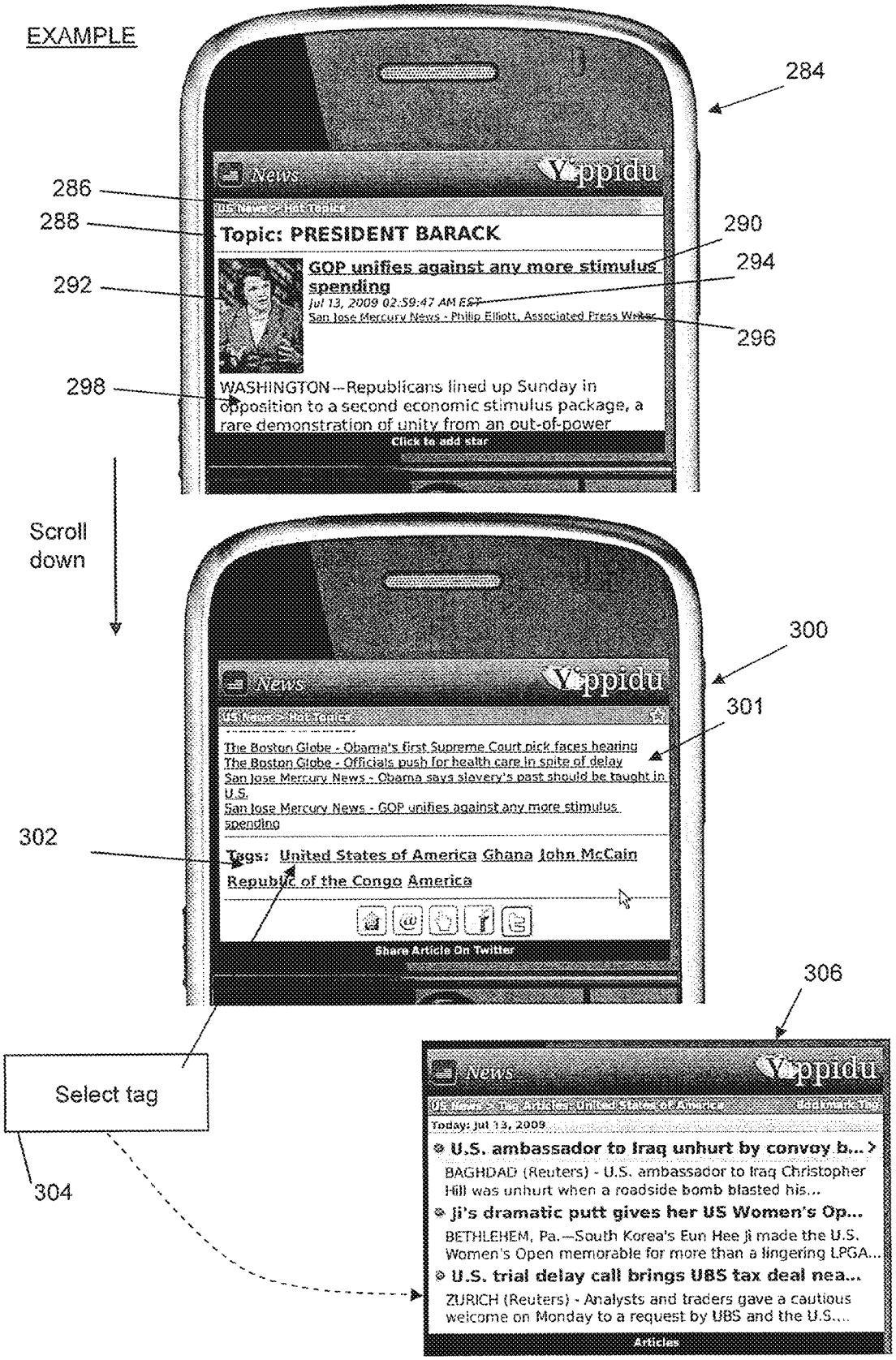
FIG. 21 is a block diagram of exemplary GUIs on a mobile device illustrating the display of a news article and the sequence of selecting a tag to display a list of related news articles.

Turning to FIG. 21, an example of a screen 284 displaying an article is provided. The screen 284 includes a heading 286 that indicates that the article is from the U.S. news feed and, more particularly, is identified as a 'hot' or popular topic. As discussed earlier, the determination of a popular topic is made during the semantic enrichment process 36 at syndication server 16. Another header 288 identifies that the topic is directed to 'President Barack'. The screen 284 also displays the title of the article 290, the time and date the article was published 294, the article's news source and author 296, and a corresponding picture 292. The first two-hundred characters of content are also displayed 298. Selecting or clicking on the title 290 will display a new screen showing the complete article (not shown). Scrolling down the screen 284 to a lower screen portion 300, a number of links 301 (e.g. hyperlinks or web links) to related articles are provided. The related articles may be the outputs of the clustering process 144 or correlation process 146, or both. The screen 300 also includes a number of related tags 302, for example United States of America, Ghana and John McCain. As described earlier, the related tags 302 were generated throughout the content extraction 32, restructuring 34 and semantic enrichment 36 processes, which were in many cases derived from the dictionaries 27. The tags 302 can be selected or 'clicked'. For example, the action of selecting 304 the 'United State of America' tag opens or displays a new screen 306 of the articles also having the same tag. It can be appreciated that the query for articles is run on the syndication server 16, and the results are passed back to the client application 26.

Figure 22:
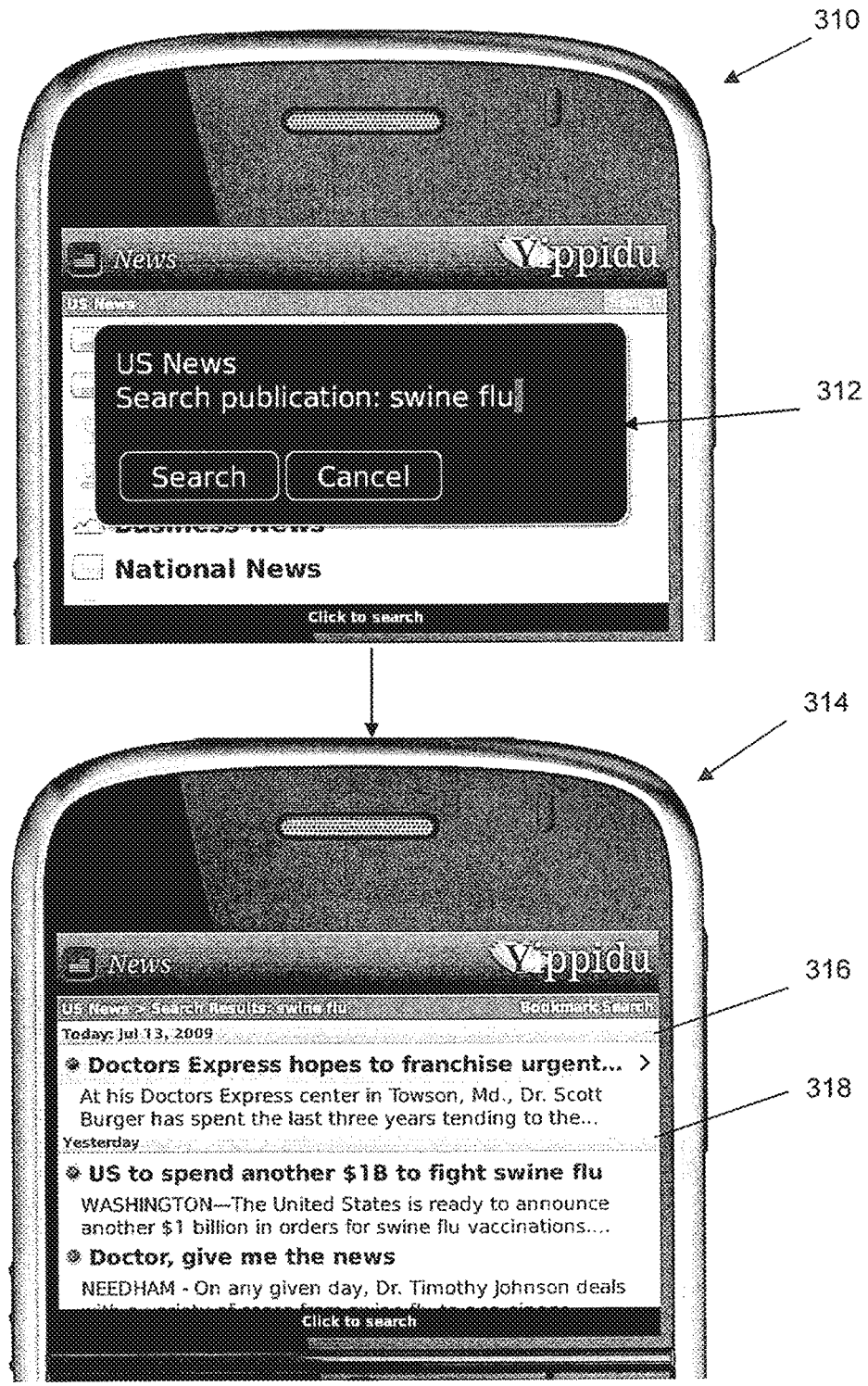
FIG. 22 is a block diagram of exemplary GUIs on a mobile device illustrating the sequence of using a search window to display news articles meeting one or more search parameters.

Turning to FIG. 22, the GUI also allows the user to run searches. Screen 310 shows that a user can enter words or phrases into a search window 312 using the mobile device's keyboard, for example. As a result, the client application 26 will send a request to the syndication server 16 to search for articles having the same keywords provided by the user. Then, as per screen 314, a number of articles that match the keyword are provided. The articles may be arranged by date, as indicated by the date headings 316 and 318.

The above described process for publishing aggregated content has a number of advantages. These include the ability to aggregate content from hundreds of online content sources and the ability to automatically extract a large number of sub-streams or sub-sub-streams of information, wherein the sub-streams or sub-sub-streams are organized by a number of factors.

It can also be appreciated that by re-organizing the content prior to publishing the same to mobile devices 24 advantageously delivers highly profiled or characterized information to the client applications 26 rather than raw data from the original sources. This reduces the data size of the content to deliver and improves the perceived quality of the delivered content. A user may perceive the content to be of higher quality if the delivered content is highly relevant to the user's interest.

Re-factoring in content publishing provides the advantage of being able to modify the structure of the content collection at the syndication server 16 without requesting any updates or re-installation of client-side applications 26. Thus, content can be given more meaning while reducing the volume of data flow between the syndication server 16 and a mobile device 24.

The advantage of using clustering in publishing aggregated content is the quick identification of the topics that are important or popular as of the present time. This has perceived importance especially on mobile devices 24, which are typically used to provide the most current data.

Other perceived advantages are related to reducing the effects of wireless latency when publishing aggregated content to a mobile device 24. In a general sense, reducing the size of data transmissions and the frequency of data transmissions reduces the wireless latency. For example, searching is reduced on the client application side 26 by correlating the topics and providing the user with a list of related articles. By reducing the user's need to search for related information, thus the exchange of information between the user's mobile device 24 and the syndication server 16 is also reduced. In this way, the user can access related articles using the displayed correlations without searching.

Also, by aggregating content, the number of HTTP requests, or ETags, are reduced because content is lumped or grouped together rather than being retrieved from the individual online information sources. Furthermore, by providing more relevant and contextual information through semantic enrichment, the need to navigate or search through data archives is reduced.

The above process also advantageously reduces the amount of content or data that is stored on a mobile device's storage or memory 22. For example, the aggregated content is filtered and duplicate data is removed at the syndication server 16. Thus, the syndication server 16 provides more relevant and specific content, which reduces the size of content delivered and stored on the mobile device 24. Furthermore, if the content available on the mobile device's storage 22 is not sufficient for the user's needs, the user can quickly access the content on the syndication server 16 based on search requests.

Tagging the articles throughout the different stages of the above process also reduces traffic requirements. The effect of the reduced traffic requirements is achieved by providing additional meaning through the tags, which refer to text that may not appear in the small amount of text returned to a user's mobile device. The effect is also achieved by the ability for tags to quickly summarize the meaning of content using a small amount of data.

Although the above has been described with reference to certain specific embodiments, various modifications thereof will be apparent to those skilled in the art without departing from the scope of the claims appended hereto.

The invention claimed is:

1. A method of republishing aggregated text to one or more mobile devices, the method computed by at least one computing device, the method comprising:
    extracting one or more text articles from an internet source or a database and extracting a corresponding data link to each of said one more text articles, said one or more extracted articles forming a stream;
    for each one or more given text articles in said stream:
        automatically searching a dictionary that includes a heading and at least one or more words grouped under said heading to automatically determine if a word in a given text article of said text articles matches one or more of said at least one or more words, wherein each and every one of said at least one or more words is semantically associated with said heading and said at least one or more words are not provided in a sentence form;
        if so, automatically adding said heading as a semantic tag to said given text article, wherein said heading is a word or a sequence of words that does not exist in said given text article;
    identifying one or more popular articles in said stream and correlating one or more related articles with each of said popular articles;
    storing a first n number of characters of each of said popular articles and said related articles in one or more folders within a cache in said at least one computing device, wherein a given one of said folders specifies a value of the number n, specifies a results parameter indicating a maximum number of said popular articles and said related articles to be stored in said given folder, and specifies a folder size parameter indicating a maximum number of said popular articles and said related articles to be sent in a transmission to a given mobile device which is less than or equal to said results parameter;
    republishing said one or more popular articles and said related articles by transmitting to said given mobile device an information bundle comprising the first n number of characters of each of said one or more popular articles and said related articles stored in said given folder up to said specified folder size parameter, one or more corresponding data links associated with said one more popular articles and said related articles, and one or more semantic tags; and wherein the first n number of characters of a given transmitted article is configured to be displayed on said given mobile device, and further displayed with at least said one or more semantic tags and said one or more corresponding data links.

2. The method of claim 1 wherein said internet source or said database is identified by at least an address.

3. The method of claim 1 further comprising adding one or more other tags to specify at least one of: a news section from which one of said text articles is extracted; a name of an information source from which said one of said text articles is extracted; a type of content of said one of said text articles; and a data format of said one of said text articles.

4. The method of claim 1 further comprising said at least one computing device performing filtering by, at least one of, excluding and including certain of said text articles in said stream to form one or more sub-streams.

5. The method of claim 4 wherein said at least one computing device applies at least one of the following conditions to perform filtering:
include said text articles comprising one or more words of a first group of words;
exclude said text articles comprising one or more words of a second group of words;
include said text articles originating from a geographical location; and,
include said text articles issued within a certain time period.

6. The method of claim 1 wherein said at least one computing device identifies said popular articles by:
grouping said text articles according to one or more topics; and,
sorting each of said topics according to the number of text articles under each of said topics, whereby said topics with the highest number of similar text articles are popular topics, and said text articles grouped under said popular topics are established as said popular articles.

7. The method of claim 1 wherein said at least one computing device correlates said related articles by:
identifying an uncommon word in one of said popular articles;
determining a frequency of said identified uncommon word in a candidate article;
computing a correlation value proportional to the frequency; and
upon determining said correlation value is equal to or greater than a threshold value, establishing said candidate article as a related article correlated to said one of said popular articles.

8. The method of claim 7 wherein said correlation value is computed by determining a quotient of said frequency and a percentage value, said percentage value indicating the number of instances of said uncommon word in a collection of text relative to the total number words in said collection of text.

9. A non-transitory computer readable medium comprising computer executable instructions for republishing aggregated text to one or more mobile devices, the executable instructions executable by at least one computing device, said executable instructions comprising:
extracting one or more text articles from an internet source or a database and extracting a corresponding data link to each of said one more text articles, said one or more extracted articles forming a stream;
for each one or more given text articles in said stream:
automatically searching a dictionary that includes a heading and at least one or more words grouped under said heading to automatically determine if a word in a given text article of said text articles matches one or more of said at least one or more words, wherein each and every one of said at least one or more words is semantically associated with said heading and said at least one or more words are not provided in a sentence form;
if so, automatically adding said heading as a semantic tag to said given text article, wherein said heading is a word or a sequence of words that does not exist in said given text article;
identifying one or more popular articles in said stream and correlating one or more related articles with each of said popular articles;
storing a first n number of characters of each of said popular articles and said related articles in one or more folders within a cache in said at least one computing device, wherein a given one of said folders specifies a value of the number n, specifies a results parameter indicating a maximum number of said popular articles and said related articles to be stored in said given folder, and specifies a folder size parameter indicating a maximum number of said popular articles and said related articles to be sent in a transmission to a given mobile device which is less than or equal to said results parameter;
republishing said one or more popular articles and said related articles by transmitting to said given mobile device an information bundle comprising the first n number of characters of each of said one or more popular articles and said related articles stored in said given folder up to said specified folder size parameter, one or more corresponding data links associated with said one more popular articles and said related articles, and one or more semantic tags; and
wherein the first n number of characters of a given transmitted article is configured to be displayed on said given mobile device, and further displayed with at least said one or more semantic tags and said one or more corresponding data links.

10. The non-transitory computer readable medium of claim 9 further comprising instructions, wherein said internet source or said database is identified by at least an address.

11. The non-transitory computer readable medium of claim 9 further comprising instructions for adding one or more other tags to specify at least one of: a news section from which one of said text articles is extracted; a name of an information source from which said one of said test articles is extracted; a type of content of said one of said text articles; and a data format of said one of said text articles.

12. The non-transitory computer readable medium of claim 9 further comprising instructions, wherein said at least one computing device performing filtering by, at least one of, excluding and including certain of said text articles in said stream to form one or more sub-streams.

13. The non-transitory computer readable medium of claim 12 further comprising instructions, wherein said at least one computing device applies at least one of the following conditions to perform filtering:
include said text articles comprising one or more words of a first group of words;
exclude said text articles comprising one or more words of a second group of words;

include said text articles originating from a geographical location; and, include said text articles issued within a certain time period.

14. The non-transitory computer readable medium of claim 9 further comprising instructions, wherein said at least one computing device identifies said popular articles by:

grouping said text articles according to one or more topics; and, sorting each of said topics according to the number of text articles under each of said topics, whereby said topics with the highest number of similar text articles are popular topics, and said text articles grouped under said popular topics are established as said popular articles.

15. The non-transitory computer readable medium of claim 9 further comprising instructions, wherein said at least one computing device correlates said related articles by:

identifying an uncommon word in one of said popular articles;

determining a frequency of said identified uncommon word in a candidate article;

computing a correlation value proportional to the frequency; and upon determining said correlation value is equal to or greater than a threshold value, establishing said candidate article as a related article correlated to said one of said popular articles.

16. The non-transitory computer readable medium of claim 15 further comprising instructions, wherein said correlation value is computed by determining a quotient of said frequency and a percentage value, said percentage value indicating the number of instances of said uncommon word in a collection of text relative to the total number words in said collection of text.

* * * * *